(12) United States Patent
Jarvenpaa et al.

(10) Patent No.: US 12,546,995 B2
(45) Date of Patent: Feb. 10, 2026

(54) OPTICAL APPARATUSES, SYSTEMS AND METHODS

(71) Applicant: Nokia Technologies Oy, Espoo (FI)

(72) Inventors: Toni Jarvenpaa, Akaa (FI); Jyrki Sakari Kimmel, Tampere (FI); Marja Salmimaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 320 days.

(21) Appl. No.: 18/025,023

(22) PCT Filed: Aug. 23, 2021

(86) PCT No.: PCT/EP2021/073280
§ 371 (c)(1),
(2) Date: Mar. 7, 2023

(87) PCT Pub. No.: WO2022/048936
PCT Pub. Date: Mar. 10, 2022

(65) Prior Publication Data
US 2023/0324682 A1 Oct. 12, 2023

(30) Foreign Application Priority Data
Sep. 7, 2020 (EP) .................................... 20194809

(51) Int. Cl.
*G02B 27/01* (2006.01)
*G02B 30/26* (2020.01)

(52) U.S. Cl.
CPC ..... *G02B 27/0101* (2013.01); *G02B 27/0179* (2013.01); *G02B 30/26* (2020.01);
(Continued)

(58) Field of Classification Search
CPC ........... G02B 27/0101; G02B 27/0179; G02B 30/26; G02B 2027/0123; G02B 2027/0187
See application file for complete search history.

(56) References Cited

U.S. PATENT DOCUMENTS 8,791,990 B2 * 7/2014 Luber ................ G02B 27/0172
348/53
9,400,395 B2 * 7/2016 Travers .............. G02B 27/0081
(Continued)

FOREIGN PATENT DOCUMENTS

CN 103823267 A 5/2014
CN 104040410 A 9/2014
(Continued)

*Primary Examiner* — Peter Radkowski
(74) *Attorney, Agent, or Firm* — McCarter & English, LLP

(57) ABSTRACT

An apparatus includes: first and second light guides, each light guide respectively including: a plurality of diffractive optical elements configured to: in-couple one or more input beams of light into the light guides, expand the input beams of light, and out-couple the expanded beams of light from the light guides to provide expanded output light beams; wherein the out-coupling diffractive optical elements include a plurality of sections thereof that are independently switchable between first and second out-coupling states. A section of the out-coupling diffractive guide in the first out-coupling state permits the out-coupling of the expanded beams of light therefrom. A section of the out-coupling diffractive guide in the second out-coupling state precludes the out-coupling of the expanded beams of light therefrom. The out-coupling diffractive guides at least partially overlap.

15 Claims, 31 Drawing Sheets

(52) U.S. Cl.
CPC ............... *G02B 2027/0123* (2013.01); *G02B 2027/0187* (2013.01)

(56) References Cited

U.S. PATENT DOCUMENTS

| | | | |
|---|---|---|---|
| 10,394,030 B2* | 8/2019 | Schowengerdt | G02B 6/0016 |
| 10,827,164 B2* | 11/2020 | Perreault | H04N 13/332 |
| 11,256,093 B2* | 2/2022 | Curtis | G02B 27/0081 |
| 11,320,571 B2* | 5/2022 | Brown | G02B 6/0076 |
| 2006/0132914 A1* | 6/2006 | Weiss | G02B 30/40 |
| | | | 359/462 |
| 2010/0053311 A1* | 3/2010 | Luber | G02B 25/004 |
| | | | 348/53 |
| 2012/0218481 A1 | 8/2012 | Popovich et al. | |
| 2014/0140653 A1* | 5/2014 | Brown | G02B 6/0033 |
| | | | 385/10 |
| 2014/0300966 A1* | 10/2014 | Travers | G02B 27/0172 |
| | | | 359/558 |
| 2018/0275411 A1* | 9/2018 | Schowengerdt | G02B 27/0081 |
| 2019/0178149 A1* | 6/2019 | Schroeder | F02B 37/20 |
| 2019/0179149 A1* | 6/2019 | Curtis | G02B 5/22 |
| 2019/0273911 A1* | 9/2019 | Perreault | H10K 59/60 |
| 2020/0183152 A1* | 6/2020 | Pennell | G02B 27/141 |
| 2020/0183174 A1* | 6/2020 | Noui | G06F 3/013 |

FOREIGN PATENT DOCUMENTS

| | | |
|---|---|---|
| CN | 104871068 A | 8/2015 |
| CN | 108681067 A | 10/2018 |
| CN | 109445108 A | 3/2019 |
| CN | 110850521 A | 2/2020 |
| WO | WO-2012172295 A1 | 12/2012 |

\* cited by examiner

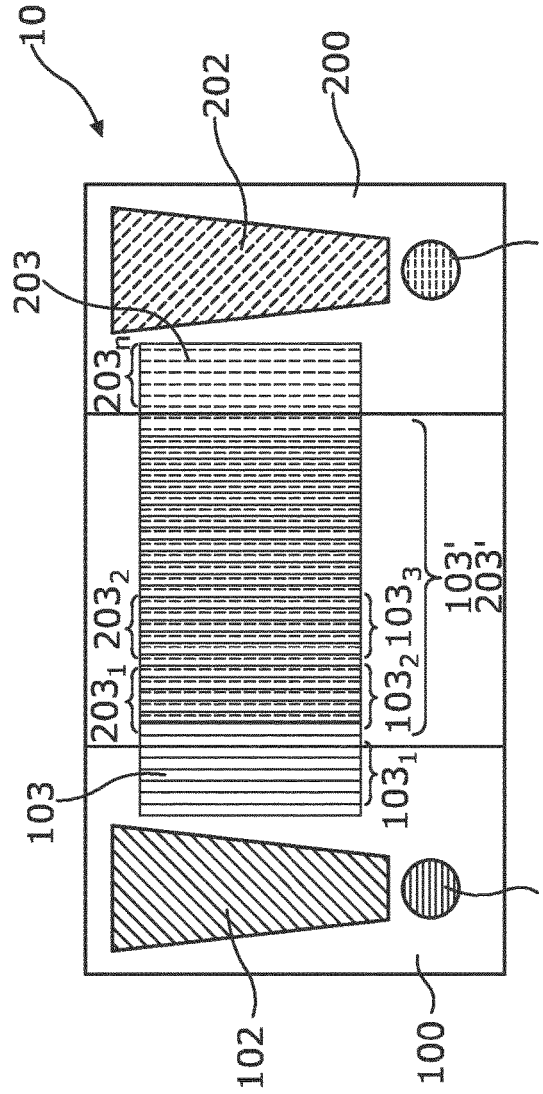
FIG. 1A
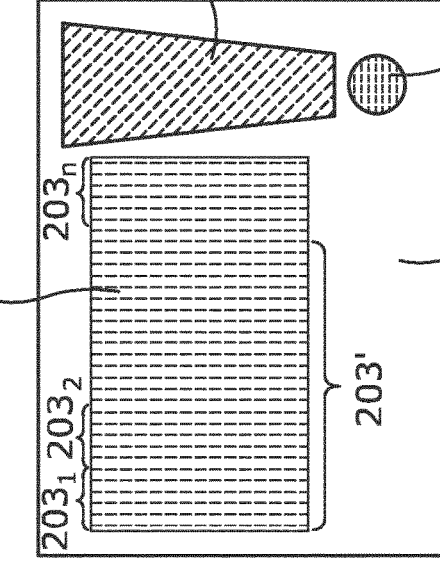
FIG. 1B
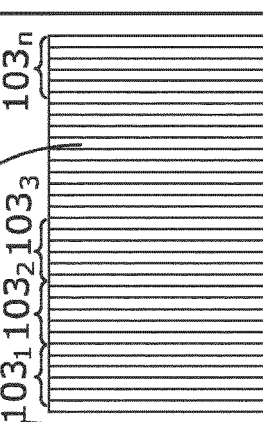

OPTICAL APPARATUSES, SYSTEMS AND METHODS

CROSS REFERENCE TO RELATED APPLICATION

This patent application is a U.S. National Stage application of International Patent Application Number PCT/EP2021/073280 filed Aug. 23, 2021, which is hereby incorporated by reference in its entirety, and claims priority to EP 20194809.8 filed Sep. 7, 2020.

TECHNOLOGICAL FIELD

Examples of the present disclosure relate to optical apparatuses systems and methods. Some examples, though without prejudice to the forgoing, relate to a stereoscopic exit pupil expansion based head-up display.

BACKGROUND

Optical apparatuses, such as exit pupil expanders, are often used in display systems, such as augmented reality and head-up display systems.

Conventional optical apparatuses are not always optimal. In some circumstances it can be beneficial to provide an improved apparatus, system and method for displaying of stereoscopic content.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the independent claims.

Any examples/embodiments and features described in this specification that do not fall under the scope of the independent claims are to be interpreted as examples useful for understanding various embodiments of the invention.

According to at least some examples of the disclosure there is provided an apparatus comprising
at least a first and a second light guiding means, wherein each light guiding means respectively comprises:
a plurality of diffractive means configured to: in-couple one or more input beams of light into the light guiding means, expand the one or more input beams of light, and out-couple the one or more expanded beams of light from the light guiding means to provide one or more expanded output light beams;
wherein the out-coupling diffractive means comprises a plurality of sections thereof that are independently switchable between a first out-coupling state and a second out-coupling state, wherein a section of the out-coupling diffractive means in the first out-coupling state permits the out-coupling of the one or more expanded beams of light therefrom, and wherein a section of the out-coupling diffractive means in the second out-coupling state precludes the out-coupling of the one or more expanded beams of light therefrom;
wherein the apparatus is configured such that the out-coupling diffractive means of one light guiding means at least partially overlaps the out-coupling diffractive means of the other light guiding means.

According to various, but not necessarily all, examples of the disclosure there is provided a method comprising:
providing at least a first and a second light guiding means, wherein each light guiding means respectively comprises:
a plurality of diffractive means configured to: in-couple one or more input beams of light into the light guiding means, expand the one or more input beams of light, and out-couple the one or more expanded beams of light from the light guiding means to provide one or more expanded output light beams;
wherein the out-coupling diffractive means comprises a plurality of sections thereof that are independently switchable between a first out-coupling state and a second out-coupling state, wherein a section of the out-coupling diffractive means in the first out-coupling state permits the out-coupling of the one or more expanded beams of light therefrom, and wherein a section of the out-coupling diffractive means in the second out-coupling state precludes the out-coupling of the one or more expanded beams of light therefrom;
at least partially overlapping the out-coupling diffractive means of one light guiding means with the out-coupling diffractive means of the other light guiding means.

According to various, but not necessarily all, examples of the disclosure there is provided computer program instructions which, when executed by a computer, cause the computer to control the out-coupling states of the plurality of independently switchable sections of the first and second out-coupling diffractive means of the apparatus of any previous claim.

According to various, but not necessarily all, examples of the disclosure there is provided an apparatus comprising:
at least a first and a second light guide, wherein each light guide respectively comprises:
a plurality of diffractive optical elements configured to: in-couple one or more input beams of light into the light guide, expand the one or more input beams of light, and out-couple the one or more expanded beams of light from the light guide to provide one or more expanded output light beams;
wherein the out-coupling diffractive optical element comprises a plurality of sections thereof that are independently switchable between a first out-coupling state and a second out-coupling state, wherein a section of the out-coupling diffractive optical element in the first out-coupling state permits the out-coupling of the one or more expanded beams of light therefrom, and wherein a section of the out-coupling diffractive optical element in the second out-coupling state precludes the out-coupling of the one or more expanded beams of light therefrom;
wherein the apparatus is configured such that the out-coupling diffractive optical element of one light guide at least partially overlaps the out-coupling diffractive optical element of the other light guide.

According to various, but not necessarily all, examples of the disclosure there is provided a non-transitory computer readable medium encoded with instructions that, when performed by at least one processor, causes at least the following to be performed: control the out-coupling states of the plurality of independently switchable sections of the first and second out-coupling diffractive optical elements of the above-mentioned apparatus.

According to various, but not necessarily all, examples of the disclosure there is provided at least one selected from the group of: a module, a device, a display, a stereoscopic display, an autostereoscopic display, a head-up display, a display unit of a vehicle and a vehicle comprising the above apparatus.

According to various, but not necessarily all, embodiments there is provided a method of providing and/or manufacturing an apparatus and/or system as described herein.

According to various, but not necessarily all, embodiments there is provided a method of using an apparatus and/or system as described herein.

The following portion of this 'Brief Summary' section describes various features that can be features of any of the examples described in the foregoing portion of the 'Brief Summary' section.

In some but not necessarily all examples, one or more sections of the out-coupling diffractive means of the first light guiding means are respectively aligned with one or more sections of the out-coupling diffractive means of the second light guiding means, and the apparatus is configured to selectively control the out-coupling states of aligned one or more sections of the first and second out-coupling diffractive means such that they are not simultaneously in the first state.

In some but not necessarily all examples, the first light guiding means is configured to provide one or more expanded output light beams to form a first exit pupil for viewing by a user's first eye, the second light guiding means is configured to provide one or more expanded output light beams to form a second exit pupil for viewing by a user's second eye, and the apparatus is configured such that the first and second exit pupils do not overlap.

In some but not necessarily all examples, the one or more input beams of light comprise a plurality of sequentially received light beams, and each of the plurality of sequentially received light beams is a projection of a section of an image.

In some but not necessarily all examples, each light guiding means is configured to: receive a set of one or more input beams of a set of image sections of an image, and output a virtual image of the image for a user to view; and the apparatus is configured such that: the output virtual image from the first light guiding means, and the output virtual image from the second light guiding means at least partly overlap in the user's field of view.

In some but not necessarily all examples, each light guiding means is configured to receive a set of one or more projected input beams of a set of image sections of an image; and the apparatus is configured to control a timing of a switching of the out-coupling states of the sections of the out-coupling diffractive means based in part on a timing of a projection of each projected input beam of light of a section of an image.

In some but not necessarily all examples, the apparatus is configured to control the out-coupling states of at least some sections of the out-coupling diffractive means based in part on at least one selected from the group of:
which of a plurality of sequentially input light beams is being projected; and
which of a plurality of sections of the image is being projected.

In some but not necessarily all examples, the one or more input light beams are projected, from a means for projecting the one or more input light beams, at one or more angles; and the apparatus is configured to control the out-coupling states of the sections of the out-coupling diffractive means based in part on the one or more angles.

In some but not necessarily all examples, the apparatus is configured to control the out-coupling states of the sections of the out-coupling diffractive means based in part on information indicative of a location of one or more of a user's eyes.

In some but not necessarily all examples, the one or more input beams for one of the light guiding means comprises a plurality of sequentially input light beams, wherein each input light beam is a projection of a section of a plurality of sections of a first image; the one or more input beams for the other of the light guiding means comprises a plurality of sequentially input light beams, wherein each input light beam is a projection of a section of a plurality of sections of a second image; and at least a portion of the first and second images form a stereoscopic image pair for stereoscopic viewing.

In some but not necessarily all examples, the apparatus further comprises one or more means configured to generate the one or more input beams.

In some but not necessarily all examples, the one or more means configured to generate the one or more input beams is configured to project one of a plurality of sections of an image during a time period; and the out-coupling states of the sections of the out-coupling diffractive means during the time period are controlled based in part on which section of the image is being projected during the time period.

In some but not necessarily all examples, a module, a device, a display, stereoscopic display, an autostereoscopic display, a head-up display, a display unit of a vehicle and/or a vehicle comprises the apparatus as mentioned above examples.

While the above examples and optional features are described separately, it is to be understood that their provision in all possible combinations and permutations is contained within the disclosure.

According to various, but not necessarily all, examples of the disclosure there are provided examples as claimed in the appended claims.

BRIEF DESCRIPTION OF THE DRAWINGS

For a better understanding of various examples of the present disclosure that are useful for understanding the detailed description and certain examples of the present disclosure, reference will now be made by way of example only to the accompanying drawings in which:

FIGS. 1A and 1B show an example of the subject matter described herein;

Figure 2:
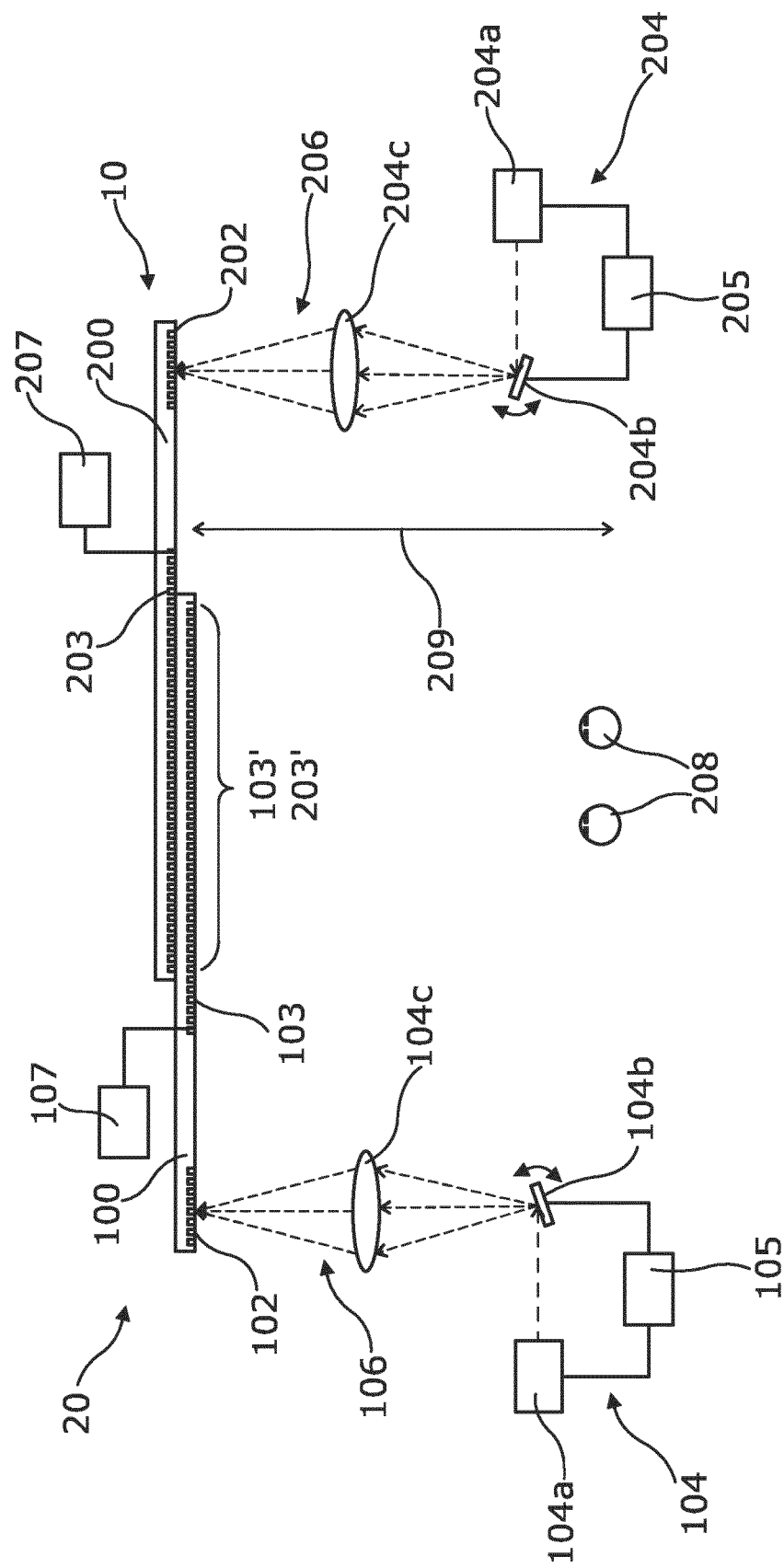
FIG. 2 shows another example of the subject matter described herein.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DEFINITIONS

DOE: diffractive optical element
EG: expansion gratings (diffractive optical element/ means for expanding input beam)
EPE: exit pupil expander
FOV: field of view
HUD: head-up display
IG: in-coupling gratings (diffractive optical element/ means for in-coupling input beam)
OG: out-coupling gratings (diffractive optical element/ means for out-coupling input beam)

DETAILED DESCRIPTION

FIG. 1A shows a schematic example of an apparatus 10. The apparatus comprises at least a first light guiding means 100 and a second light guiding means 200. Each light guiding means may be, for example: a light guide, a wave guide, a plate, an optical substrate, a substrate of optical material that includes a light/wave guide.

Each of the first and second light guiding means 100, 200 comprises a plurality of diffractive means.

The first light guiding means 100 comprises at least:
first diffractive means 101 configured to in-couple one or more first input beams of light 106 into the first light guiding means,
first diffractive means 102 configured to expand the first one or more input beams of light (such expansion being in a first dimension), and
first diffractive means 103 configured to further expand (such expansion being in a second dimension) and out-couple the first one or more expanded beams of light from the first light guiding means to provide one or more first expanded output light beams (i.e. for viewing by a user's first eye thereby forming a first expanded exit pupil).

Similarly, the second light guiding means 200 comprises at least:
second diffractive means 201 configured to in-couple one or more second input beams of light 206 into the second light guiding means,
second diffractive means 202 configured to expand the second one or more input beams of light (such expansion being in a first dimension), and
second diffractive means 203 configured to further expand (such expansion being in a second dimension) and out-couple the second one or more expanded beams of light from the second light guiding means to provide one or more second expanded output light beams (i.e. for viewing by a user's second eye thereby forming a second expanded exit pupil).

At least some of the plurality of diffractive means may be, for example: a diffractive optical element, diffractive structure, diffraction gratings, holographic gratings, Bragg gratings, switchable gratings (whose outcoupling therefrom can be selectively switched ON and OFF or to an intermediate state) diffraction areas, rulings, ridges, surface relief diffractive gratings or any suitable optical component or feature having a periodic structure that splits and diffracts light into several beams travelling in different directions.

In some examples, each of the first and second light guiding means 100, 200 is configured to increase the size of an exit pupil of an input virtual image/exit pupil from a display means, such as one or more projection engines (not shown). In some examples, the first and second light guiding means 100, 200 can be considered as first and second exit pupil expanders (EPE). Such EPEs may be a transparent display light guide that can be used in augmented reality (AR) headsets and head-up display (HUD) systems. Certain examples of the invention propose a novel way to add stereoscopic display capability to an EPE HUD system.

In some examples, the first and second light guiding means (and/or their various diffractive areas) can be substantially the same or different. For example, the first and second light guiding means can comprise different material or materials, and/or can have different thickness and/or size and/or shape and/or form and/or characteristics (e.g. not least with regards to the configuration of their respective plurality of diffractive means).

Each of the out-coupling diffractive means 103, 203 is divided into a plurality of sections/sub-portions $103_1$-$103_n$, $203_1$-$203_n$. Such sections may comprise one or more: individual gratings, sets/groups of gratings and sub-areas/strips of the out-coupling diffractive means. Each section of the out-coupling diffractive means 103, 203 is independently switchable/configurable between at least a first out-coupling state/mode and a second out-coupling state/mode. The first out-coupling state of a section is a state that substantially permits the out-coupling of one or more beams of light (e.g. the section has a diffractive out-coupling efficiency above a threshold amount) from the section. The second out-coupling state of a section is a state that substantially precludes the out-coupling of one or more beams of light from the section (e.g. the section has a diffractive out-coupling efficiency below a threshold).

When a section of an out-coupling diffractive means is in the first out-coupling state, it permits the out-coupling of the one or more expanded beams of light therefrom (which may be referred to as an "ON" state). Whereas, when a section is in the second out-coupling state, it precludes the out-coupling of the one or more expanded beams of light therefrom (which may be referred to as an "OFF" state). The sections of the out-coupling diffractive means are selectively and independently configurable/switchable between the two states. Any suitable switchable grating and mechanism for switching gratings ON and OFF (or in some mode between) may be used, not least for example switchable volume holograms such as switchable Bragg gratings.

As shown in FIG. 1A, the apparatus is configured such that the switchable out-coupling diffractive means of one light guiding means at least partially overlaps the switchable out-coupling diffractive means of the other light guiding means. For example, the second light guiding means may be stacked on top of the first light guiding means or vice versa. The second out-coupling diffractive means may overlie and fully/entirely overlap the first out-coupling diffractive means and vice versa. In such a manner, switchable sections of the first out-coupling diffractive means are aligned with (overlying or underlying) switchable sections of the second out-coupling diffractive means. For example, section $103_2$ of the first out-coupling diffractive means is aligned with and overlapped by section $203_1$ of the second out-coupling diffractive means.

The provision of such switchable sections of overlapping out-coupling diffractive means may enable suitable sections of the first and second out-coupling diffractive means to be selectively switched between first and second states. For example, a particular set of output gratings can be turned "ON"/active (enabling outcoupling) and the rest "OFF"/inactive (no outcoupling). As will be discussed further below, various examples of the disclosure may enable first and second input images to be output/displayed and separately viewed by each of a user's first and second eyes (i.e. left and right eye). The ability to separately output/display the input images for the left and right eye enables the display of stereoscopic images/content such that the apparatus may be used as an autostereoscopic display for displaying a stereoscopic image formed of differing first and second input images (i.e. images from differing perspectives/viewpoints).

FIG. 1B shows an exploded view of the apparatus 10 in which, for clarity, the first and second light guiding means 100, 200 are shown separately rather than stacked on top of one another.

In some examples, one or more sections of the out-coupling diffractive means of the first light guiding means are respectively aligned with one or more sections of the out-coupling diffractive means of the second light guiding means, and the apparatus is configured to selectively control the out-coupling states of aligned one or more sections of the first and second out-coupling diffractive means such that they are not simultaneously in the first state. The state of each section may be individually/independently controlled. For example, the out-coupling states of overlapping sections of the first and second OG's are controlled such that whilst a section of the first OG is ON, the overlapping section of the second OG is OFF.

In some examples, the first light guiding means is configured to provide one or more expanded output light beams to form a first exit pupil (or 'eye box') for viewing by a user's first eye, and the second light guiding means is configured to provide one or more expanded output light beams to form a second exit pupil for viewing by a user's second eye, and the apparatus is configured such that the first and second exit pupils do not overlap (i.e. not least by controlling, at any one instance, which section of the input image is projected and which section of the OG is ON).

In some examples, the one or more input beams of light comprise a plurality of sequentially received light beams (i.e. individually scanned and projected so as to be received one at a time/one after the other), wherein each of the plurality of sequentially received light beam is a projection of a section of an image. Such a section of the image may correspond to one or more segments, strips, scan lines, pixel columns of the image.

In some examples, each light guiding means is configured to receive a set of one or more input beams of a set of image sections of an image, and output a virtual image of the image for a user to view. The apparatus is configured such that the output virtual image from the first light guiding means, and the output virtual image from the second light guiding means at least partly overlap in the user's field of view. In some examples, the light guiding means fully overlap, i.e. entirely overlie one another; whereas they only partially overlap in other examples.

In some examples, the apparatus is configured to control a timing of a switching of the out-coupling states of the sections of the out-coupling diffractive means based in part on a timing of a projection of each input beams of light of a section of an image. For example, the timing of the switching of the sections of the out-coupling diffractive means may be synchronized with the timing of the projection of each input image section.

In some examples, the apparatus is configured to control the out-coupling states of at least some sections of the out-coupling diffractive means based in part on at least one selected from the group of: which of the plurality of sequentially input light beams is being projected; and which of the plurality of sections of the image is being projected.

In some examples the one or more input light beams are projected, from a means for projecting the one or more input light beams, at one or more angles; and the apparatus is configured to control the out-coupling states of the sections of the out-coupling diffractive means based in part on the one or more angles. The means for projecting the one or more input light beams may comprise a projection display that generates, a virtual image (projected at infinity) from an input source image, wherein the virtual image having a small exit pupil with an angular field of view (typically of the order of 20-40 degrees of visual angle diagonally). An EPE receives the virtual image and expands/multiplies the exit pupil in two directions, with the field of view through the EPE remaining the same. Each pixel or scan line of an input image translates to a certain angle when projected from the projector and incident to the EPE (and also a certain angle when output from the EPE). Whether the projection display is of panel type such as Liquid crystal on silicon (LCoS) or Digital Light Processing (DLP), or scanning laser or LED type; for each pixel or scan line the output angle is known. In examples of the invention, the selection of which section of the out-coupling diffractive means is ON and which sections are OFF at any instance in time is based in part on the angle associated with the pixel or scan line being projected at that instance in time.

In some examples the apparatus is configured to control the out-coupling states of the sections of the out-coupling diffractive means based in part on information indicative of a location (e.g. absolute location or position relative to apparatus) of one or more of a user's eyes (e.g. head tracking information).

In some examples, the one or more input beams for one of the light guiding means comprises a plurality of sequentially input light beams, wherein each input light beam is a projection of one of a plurality of sections of a first image; the one or more input beams for the other of the light guiding means comprises a plurality of sequentially input light beams, wherein each input light beam is a projection of one of a plurality of sections of a second image; and wherein at least a portion of the first and second images form a stereoscopic image pair for stereoscopic viewing. Such an image pair may comprise e.g. parallax shifted images of a scene, thereby providing stereoscopic content which, when rendered on a stereoscopic display device provide a viewer with the perception of viewing a 3D image.

In some examples, the apparatus further comprises one or more means configured to generate the one or more input beams. Such means may comprise, not least for example a scanning type projection display such as laser scanner projection micro-display, wherein the micro display comprises pixels at more than fifty lines per millimetre.

In some examples, the one or more means configured to generate the one or more input beams is configured to project one of a plurality of sections of an image during a time period, and wherein the out-coupling states of the sections of the out-coupling diffractive means during the time period are controlled based in part on which section of the image is being projected during the time period.

In some examples, the apparatus is configured to project a sequence of sections of the input image and control the out-coupling state of sections of the out-coupling diffractive means based in part on a timing of the projection of the sequence of sections of the input image such that a given section of image (having a particular spatial position within the image and a particular field of view) is outcoupled from a given section of the out-coupling diffractive means (having a particular spatial position within the out-coupling diffractive means and a particular field of view)

In some examples, the apparatus further comprises one or more controllers configured to control one or more of:
the one or more means configured to generate the one or more input beams, and
the switchable sections of the out-coupling diffractive means.

In some examples, the apparatus is comprised in: a module, a device, a display, stereoscopic display, an autostereoscopic display, a head-up display, a display unit of a vehicle and/or a vehicle.

In some examples, one or more of the first and second in-coupling diffractive means may also be selectively switchable and the control of the same may likewise be synchronized based in part on the which section of the input image is being projected at a particular instance/time period.

In some examples, one or more of the first and second expanding diffractive means may also be selectively switchable and the control of the same may likewise be synchronized based in part on the which section of the input image is being projected at a particular instance/time period.

For the purposes of the following description of examples of the disclosure, hereinafter:
the first and second light guiding means will be referred to as first and second Exit Pupil Expanders, (EPE's);
the first and second in-coupling diffractive means will be referred to as first and second In-coupling Gratings (IG's);
the first and second expanding diffractive means will be referred to as first and second Expanding Gratings (EG's); and
the first and second out-coupling diffractive means comprising switchable sections will be referred to as first and second Out-coupling Gratings (OG's).

FIG. 2 shows a schematic example of a system 20, comprising an apparatus 10 similar to that of FIG. 1A, i.e. comprising stacked/overlapping first and second EPE's 100, 200, with respective first and second: IG's 101, 201; EG's 102, 202; and OG's 103, 203 for receiving incident one or more first and second light beams 106, 206 and outputting one or more first and second expanded light beams of the same (not shown) for viewing by a user's first and second eyes 208 such that each of the one or more first and second light beams 106, 206 form an exit pupil for a respective first and second eye of the user.

The system further comprises means 107, 207 for controlling the first and second OG's 103, 203, i.e. means for individually controlling the out-coupling state of each of the plurality of selectively switchable sections thereof.

The system further comprises first and second means 104, 204 for generating the first and second one or more input beams 106, 206 that are respectively incident to the first and second IG's 101, 201. Any suitable means 104, 204 for generating the one or more input beams 106, 206 may be used, not least for example: a projection engine, a scanning projection engine, an optical engine, and a micro-display for generating the one or more light beams based on source image data. In some examples, a scanning type of projection display is used in this regard, e.g. with a laser scanner or with a scanning LED array. Other projection type displays with fast response times and fast refresh rates may also be applicable, such as Digital Light Processing (DLP) and Liquid crystal on silicon (LCoS) type of projection engines.

In some examples, the means for generating the one or more input beams provides one or more collimated input beams that are incident (at differing angles dependent on the field of view and/or spatial location within the input image of the part of the input image that light beam relates to) to the IG's of the EPE's, which are then expanded and outcoupled from the EPE's via the EG's and OG's to provide collimated output beams a user's first and second eyes, thereby providing first and second expanded exit pupils for the user's first and second eyes respectively. By controlling which particular switchable sections of the overlapping OG's are "ON" and which are "OFF" at any instance (as well as in combination with control of the input light beams and the sections of the source input image the light beams relate to as will be discussed below), the size and position of the first and second exit pupils can be controlled and dynamically adjusted such that they do not overlap and hence such that separate/different output images (corresponding to the separate input images) can be viewed by each eye, thereby enabling the display of stereoscopic content.

In FIG. 2, a laser scanning projection engine is shown, with one or more lasers 104a generating a source of light (at one or more frequencies/colours). Image information may be imparted to the light via any suitable means, not least such as a spatial light modulator or micro display (not shown). The (modulated) light is then scanned via a Micro-electromechanical system (MEM) such as a scanning mirror 104b and is then incident, via one or more optical devices/optical elements (e.g. lens) 104c for magnifying and/or collimating the light, to the IG 102. The second means 204 for generating the second one or more input beams 206 likewise comprises an equivalent arrangement of components, i.e. comprising: one or more lasers 204a, scanning mirror 204b, and one or more optical devices/optical elements (e.g. lens) 204c.

The first and second means 104, 204 for generating the first and second one or more input beams are respectively controlled by control means 105 and 205.

Whilst separate control means 105, 205, 107, 207 are shown in FIG. 2, it is to be appreciated that one (or more) control means may be provided to provide all or some of the various control functions.

FIGS. 3A-3I illustrate an example of the subject matter described herein. These FIGs illustrate how a stereoscopic image is displayed to a user via a system comprising: an apparatus 10 (such as described above having two stacked EPE's 100, 200 each with switchable OG's 103, 203) and two projectors (not shown).

FIGS. 3A-3I illustrate the process for controlling the projection of the input beams of the source input images that are incident to each EPE and the simultaneous control the out-coupling states of the first and second OG's.

As will be discussed below, each of FIGS. 3A-3I show particular scan lines (from the first scan line of the input image in FIG. 3A to the last scan line of the input image in FIG. 3I) of scanning projection engines or pixel columns (or sets of columns) of matrix type of projection display panels and the accompanied switching of the relevant sections of the OG's for outcoupling the same. When the left (L) and right (R) eyes are correctly aligned with the left EPE's exit pupil position and right EPE's exit pupil position (or alternatively when the left EPE's exit pupil position and right EPE's exit pupil position are configured to be correctly aligned with the left and right eyes, e.g. with regards to the users eye relief distance and interpupillary distance [N.B. head tracking is discussed with respect to FIGS. 6A-6D]), the left eye will see only an output image (corresponding to the first input image) from the first EPE setup and the right eye will see only the output image (corresponding to the second input image) from the second EPE setup. This may thereby enable stereoscopic viewing to be achieved which may be used to provide a stereoscopic EPE based head-up display (HUD).

A stereoscopic image may be formed of: a first input image/image source [left eye image] 310 which is output/displayed by the apparatus 10 as a first output virtual image [left eye virtual image having an expanded first/left exit pupil] to a user's first/left eye; and a second input image/image source [right eye image] 320 which is displayed as a second output virtual image [right eye virtual image having an expanded second/right exit pupil] to a user's second/right eye.

The system of FIGS. 3A-3I, is configured such the first input image 310, projected by the first scanning projector and output by the first OG, is perceived having a first position and a first size within the user's field of view; and the second input image 320 projected by the second scanning projector and output by the second OG is perceived having a second position and size within the user's field of view that is substantially the same as the first position and size. In this regard, two virtual output images (that are respectively perceived via the two exit pupils) may be considered to overlie one another, i.e. fully overlap, in the user's field of view, or, to put it another way, the projectors have fully overlapping fields of view.

The system is configured such that the first/left OG out-couples light only to a first/left exit pupil for the user's first/left eye (i.e. the first exit pupil is sized and positioned/aligned with the user's first/left eye, wherein the first/left exit pupil does not overlap the second/right exit pupil and hence does not additionally encompass the user's second/right eye). Similarly, the second/right OG out-couples light only to a second/right exit pupil for the user's second/right eye (i.e. the second exit pupil is sized and positioned/aligned with the user's second eye and does not additionally encompass the user's first eye). Such an effect can be achieved using scanning type projection displays together with switchable first and second OG's that are synchronized with each other. In some examples, where the first and second OG's are in sync and display content for the same portion of the image (i.e. overlapping L/R pixels in the FOV are both ON at the same time), particular sections of the first OG that are overlapped by particular sections of the second OG are not simultaneously both in the first out-coupling state (Active/ON state enabling outcoupling). In some examples, if the first and second OG's are off sync (or synchronized in a different way) and e.g. the first is displaying right edge of the image/FOV whilst the second is simultaneously displaying the left edge of the image/FOV, some overlapping sections might both be in Active/ON state at the same time.

Depending on the angle of light output from the first and second projectors, a suitable section/area of first and second OG's is turned active (enabling out-coupling) and the remaining area is turned inactive (no out-coupling). This enables the system to behave like an autostereoscopic display, where the left and right eye input/output images can be controlled independently/separately, and viewed by a user's first and second eyes respectively such that a stereoscopic image can be displayed.

Figure 3A:
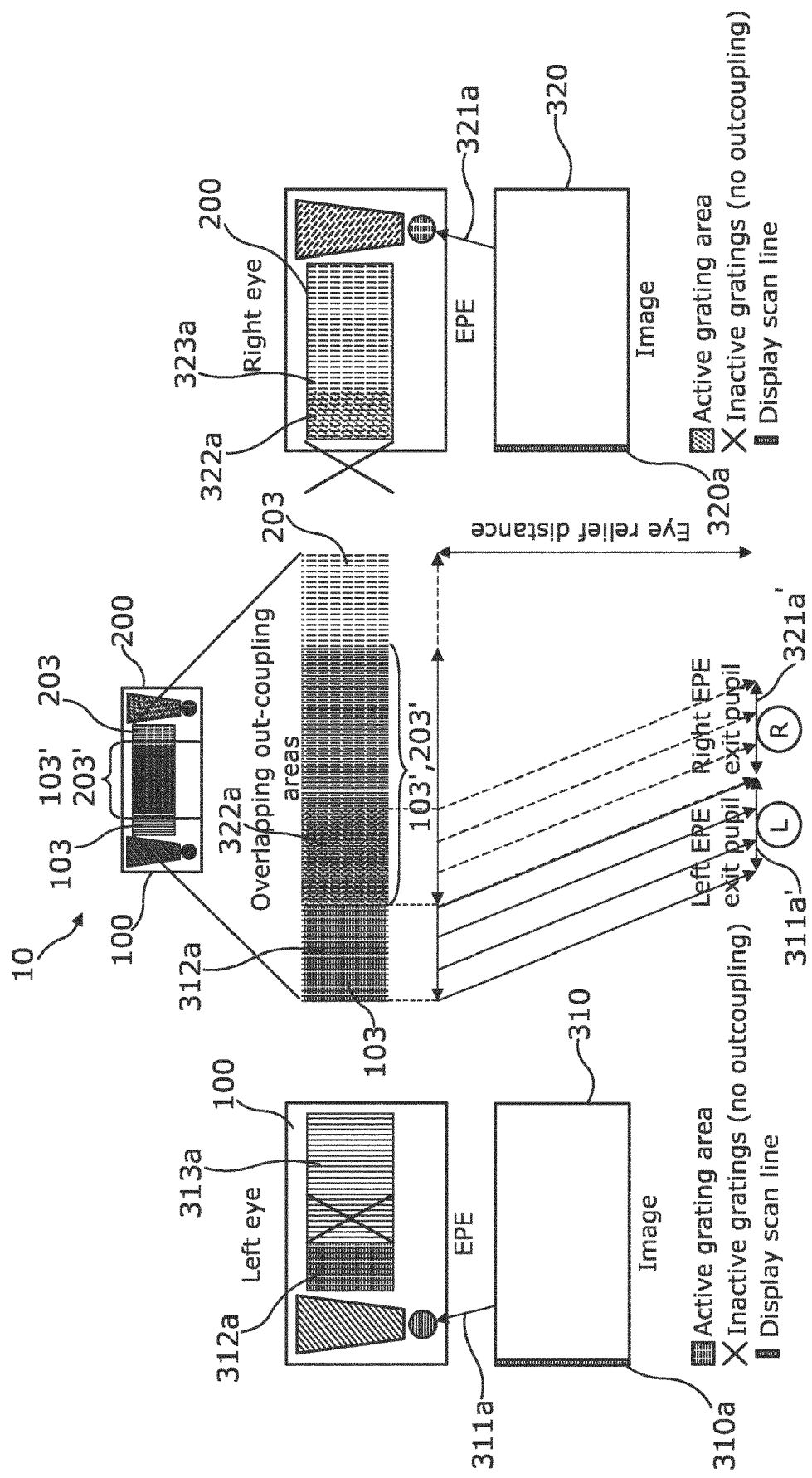
FIGS. 3A-3I show another example of the subject matter described herein.

For each of the FIGS. 3A-3I, the apparatus is configured with partial overlap of the first and second EPE's as per FIG. 1A, as is denoted by the representation of the apparatus at the top of FIG. 3A. As illustrated, a (central) portion 103' and 203' of the first and second OG's 100, 200 overlap, with a (left) side end portion of the first OG not overlapped by any of the second OG, and a (right) side end portion of the second OG not overlapping any of the first OG.

In FIG. 3A, below the representation of the apparatus 10, an enlarged view of the partially overlapping first and second OG's is shown. This also illustrates the out-coupling states sections of the first and second OG's, along with the first and second light beams 311a', 321a' out coupled from the active OG sections.

On the left-hand side of FIG. 3A, a representation of the first EPE is provided which more clearly illustrates the out-coupling states of sections of the first OG, i.e. whether sections thereof are in a first out-coupling state (i.e. if they are Active or "ON" such that out-coupling of light occurs therefrom), else if they are in a second out-coupling state (i.e. if they are Inactive or "OFF" such that no out-coupling of light occurs therefrom).

Whilst the legend indicates that Inactive gratings are represented by "X", it is to be appreciated that, in some examples, the Inactive gratings may correspond to all the remaining areas of the OG which are not Active (such Active areas of the OG being represented by being shaded in), i.e. such that all the non-shaded areas of the OG are Inactive. However, in some examples, only the areas indicated by "X" are Inactive, such areas corresponding to those immediately adjacent Active areas of an overlapping/underlapping OG. At least such "X" regions of the first and second OG's are switched to be Inactive so that no outcoupling occurs therefrom, as otherwise this would alter the size and position of the respective exit pupil which may cause it to overlap with an adjacent exit pupil such that the adjacent eye would be within the exit pupil of both the left EPE and the right EPE. This would be detrimental to the user's perception of the left and right output images and hence detrimental to the perception of 3D stereoscopic content. In other words, the areas indicated with "X" mean that by no means should there be out-coupling from this area, whereas, at least from the user's perspective, out-coupling from the remaining areas is less important (i.e. it would not affect the viewers perception of the output virtual image).

On the right-hand side of FIG. 3A, a representation of the second EPE is likewise provided which more clearly illustrates the out-coupling states of sections of the second OG.

FIG. 3A also illustrates the first source input image 310, which is split up/divided into a plurality of sections. Such sections may be different discrete non-overlapping sections of the source input image and/or may correspond to individual one or more scan lines of the scanning projector.

FIG. 3A shows a first section 310a. Such an individual section may correspond to one or more: strips, segments, scan lines, or pixel columns of the input image or one or more sets thereof.

A first scanning projector (not shown) is configured such that the individual section 310a of the first input image 310 is projected via light beam 311a and input to the first IG of the first EPE (it is to be noted that the angle of the arrow 311a is not indicative of the direction and angle of incidence of the input light beam). The projected section of the first input image is expanded by the first EG of the first EPE. A section 312a of the first OG is selected and switched to a first/ON out-coupling state, and the remaining sections 313a are switched to the second/OFF out-coupling state. This ensures that the input light beam 311a for the section of the input image 310a is out-coupled only from the ON section 312a of the first OG, thereby providing a first expanded output beam 311a' whose dimension is based in part on the size of the ON section 312a of the first OG.

Similarly, a second scanning projector (not shown) is configured such that an individual section 320a of the second input image 320 is projected via light beam 321a and input to the second IG of the second EPE (again, it is to be noted that the angle of the arrow 321a is not indicative of the direction and ingle of incidence of the input light beam). The projected section of the second input image is expanded by the second EG of the second EPE. A section 322a of the second OG is switched to a first/ON out-coupling state and the remaining sections 323a are switched to the second/OFF out-coupling state. This enables the input light beam 321a for the section of the input image 320a to be out-coupled only from the section 322a of the second OG providing a second expanded output beam 321a' whose dimension is based in part on the size of the ON section 322a of the second OG.

Whilst examples have been discussed with only ON and OFF outcoupling states, it is to be appreciated that in some examples the control schemes of the out-coupling states can be more complex. For example, intermediate states with varying diffraction efficiency (somewhere between ON and OFF) can be enabled in order for the output beams to be optimized. Optimization can be based e.g. on maximizing output luminance uniformity, colour uniformity, or system efficiency.

Figure 3B:
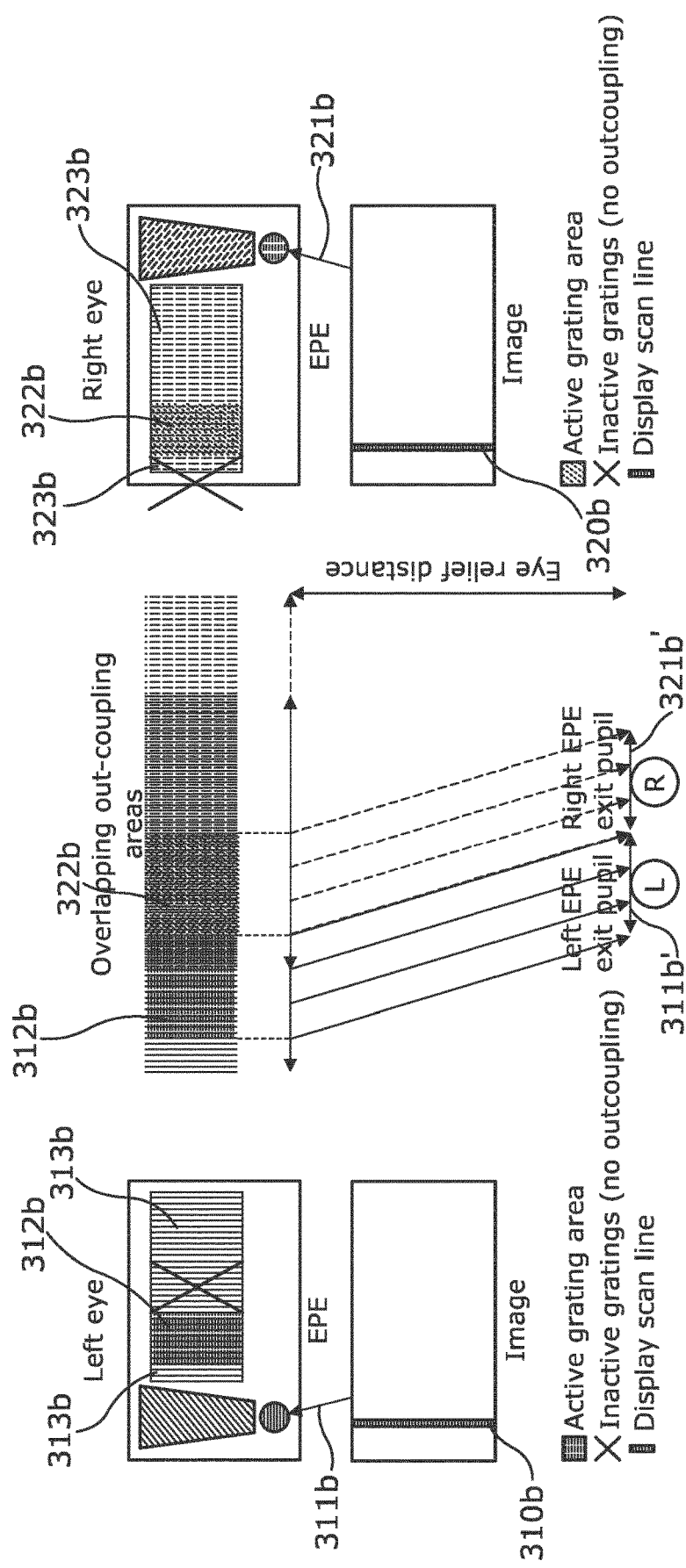
Figure 3C:
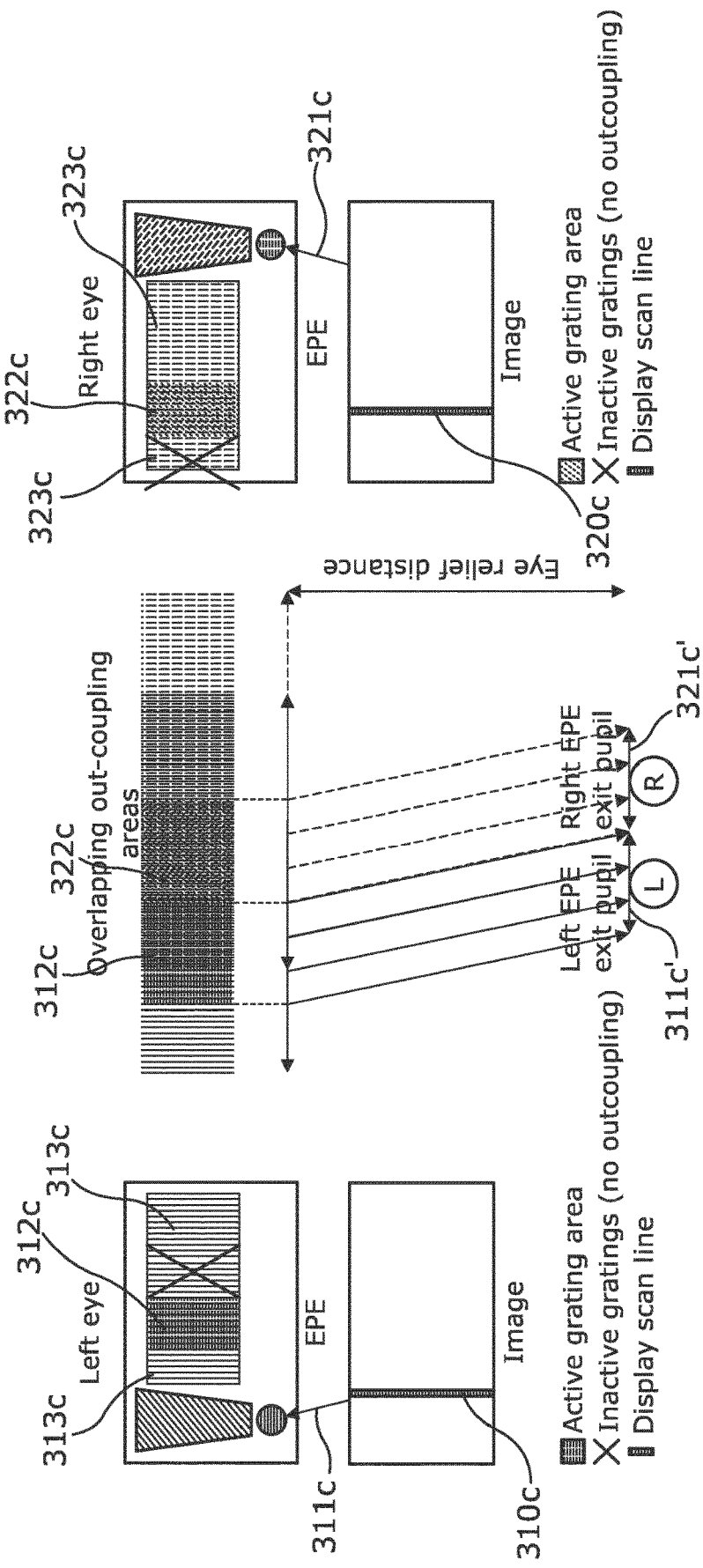
Figure 3D:
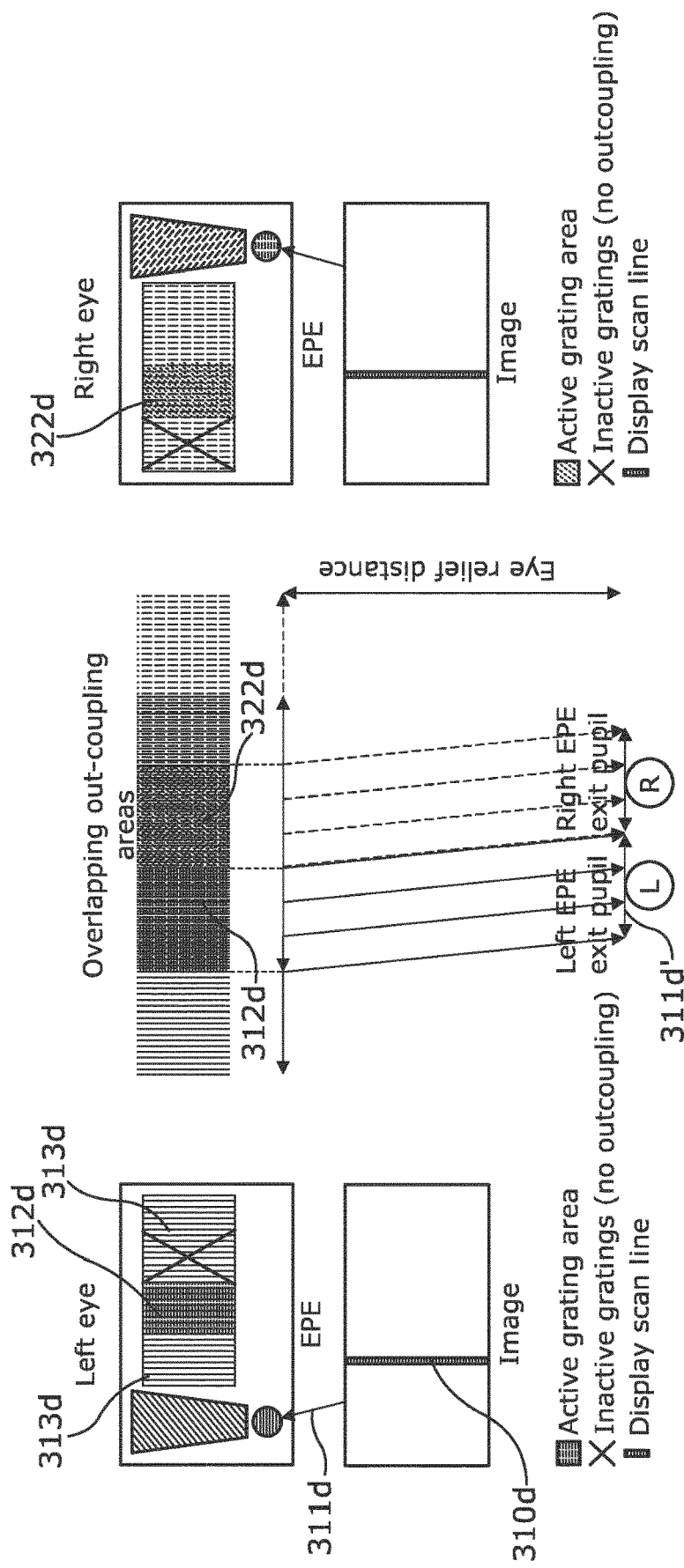
Figure 3E:
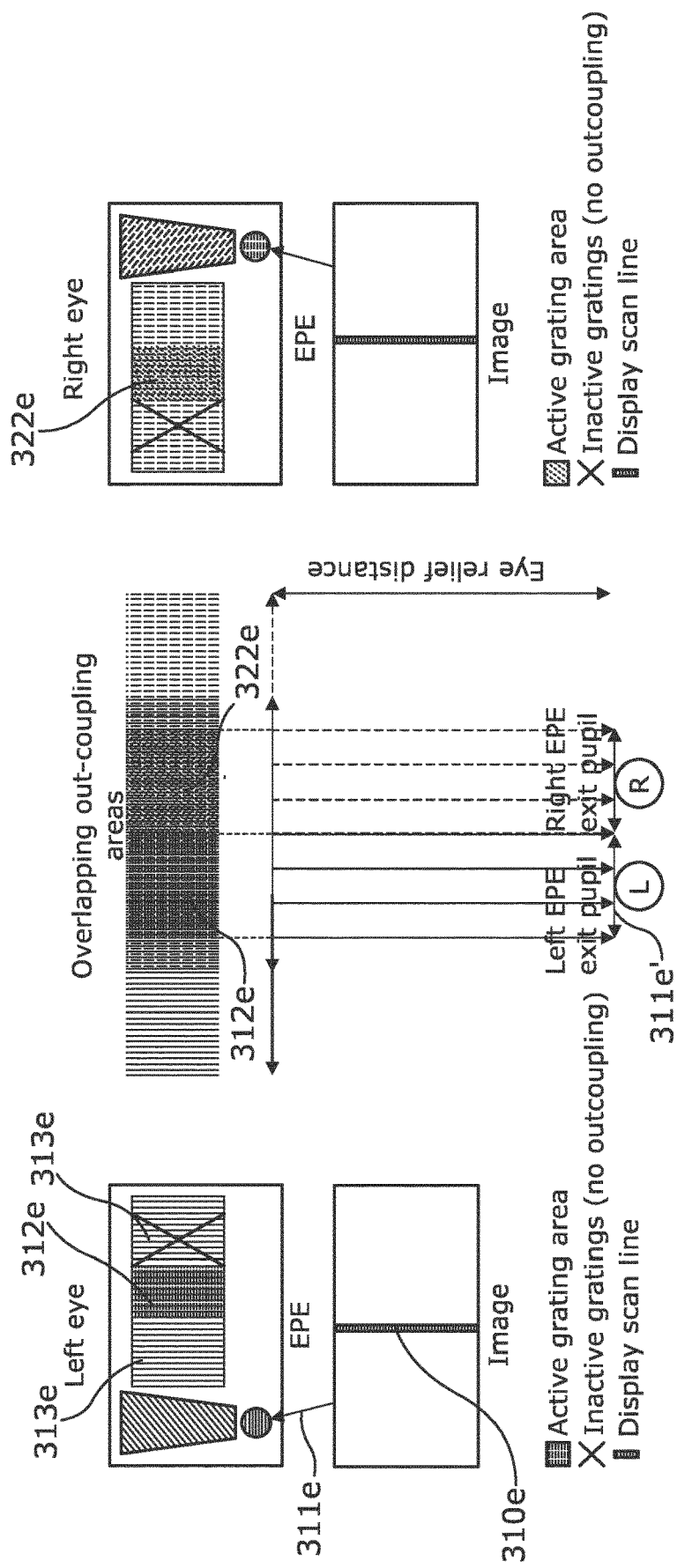
Figure 3F:
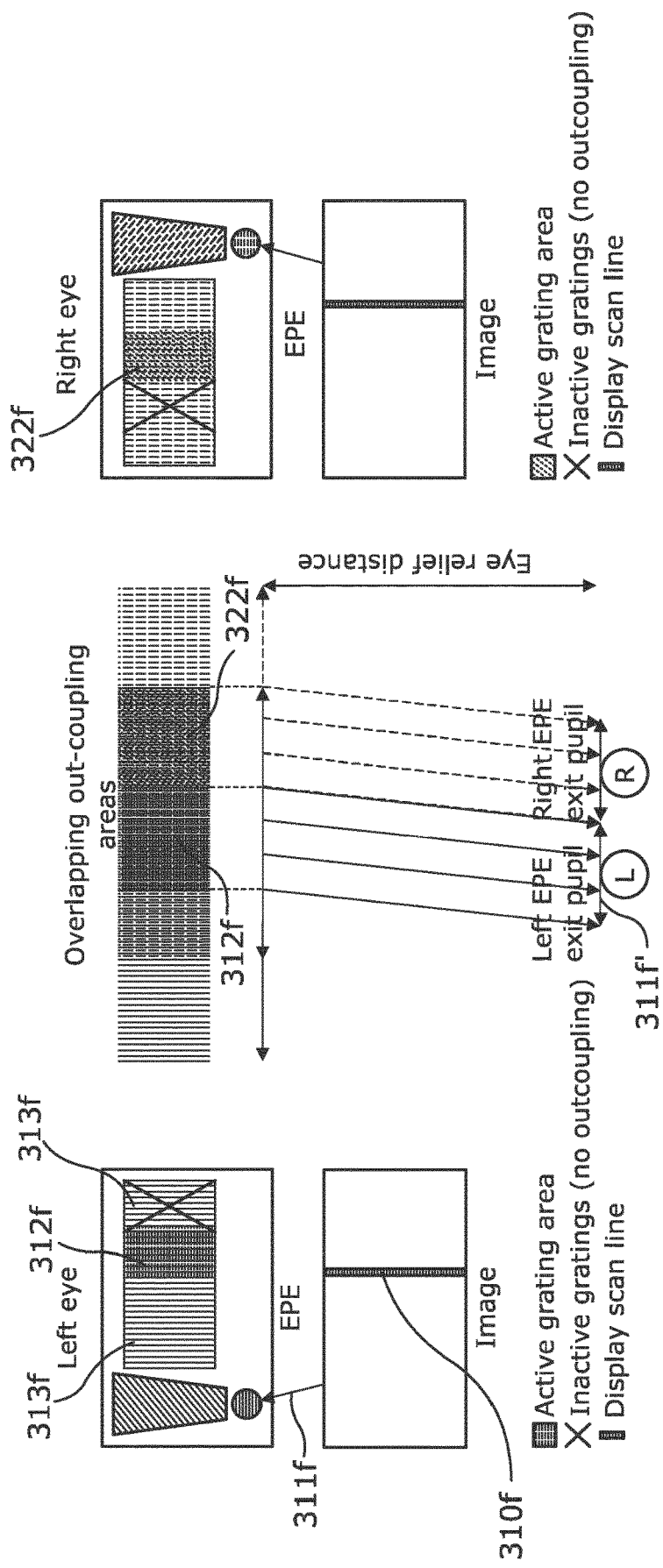
Figure 3G:
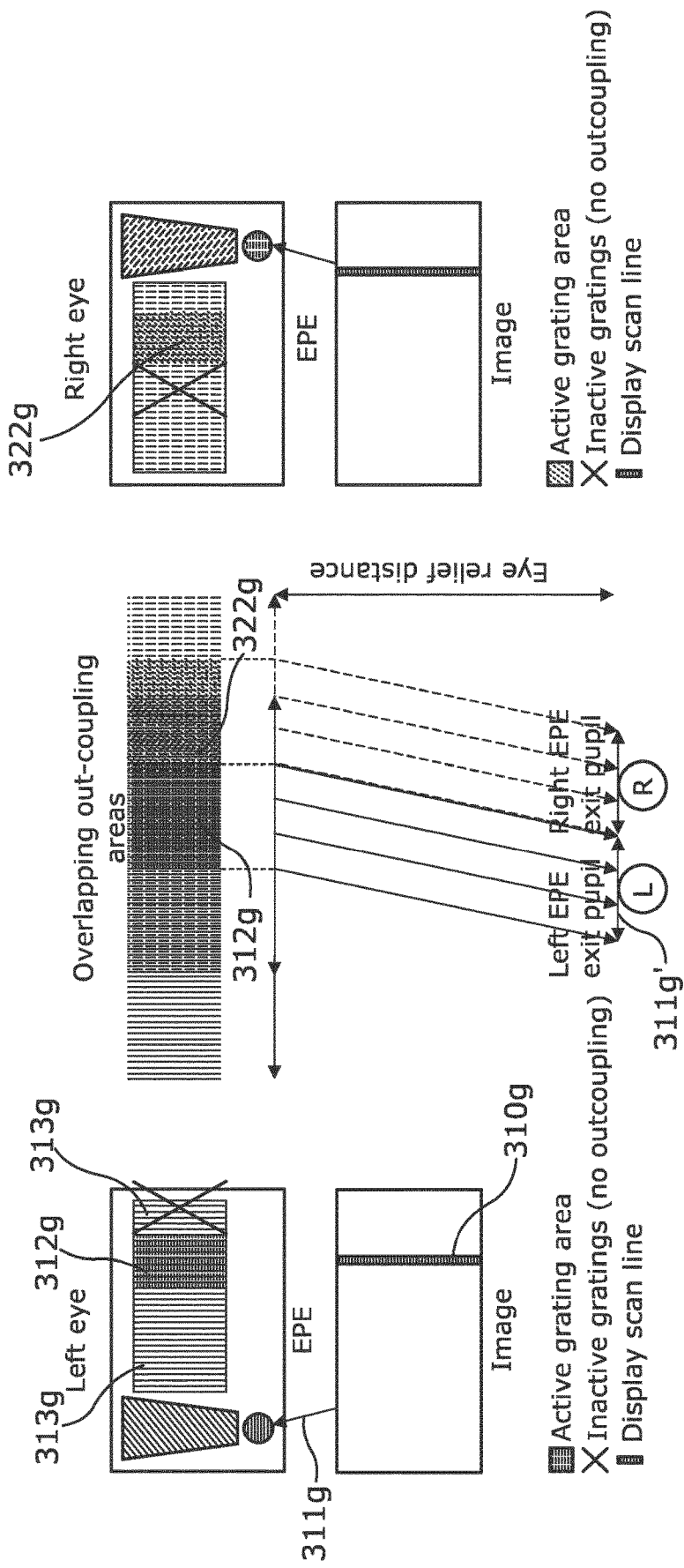
Figure 3H:
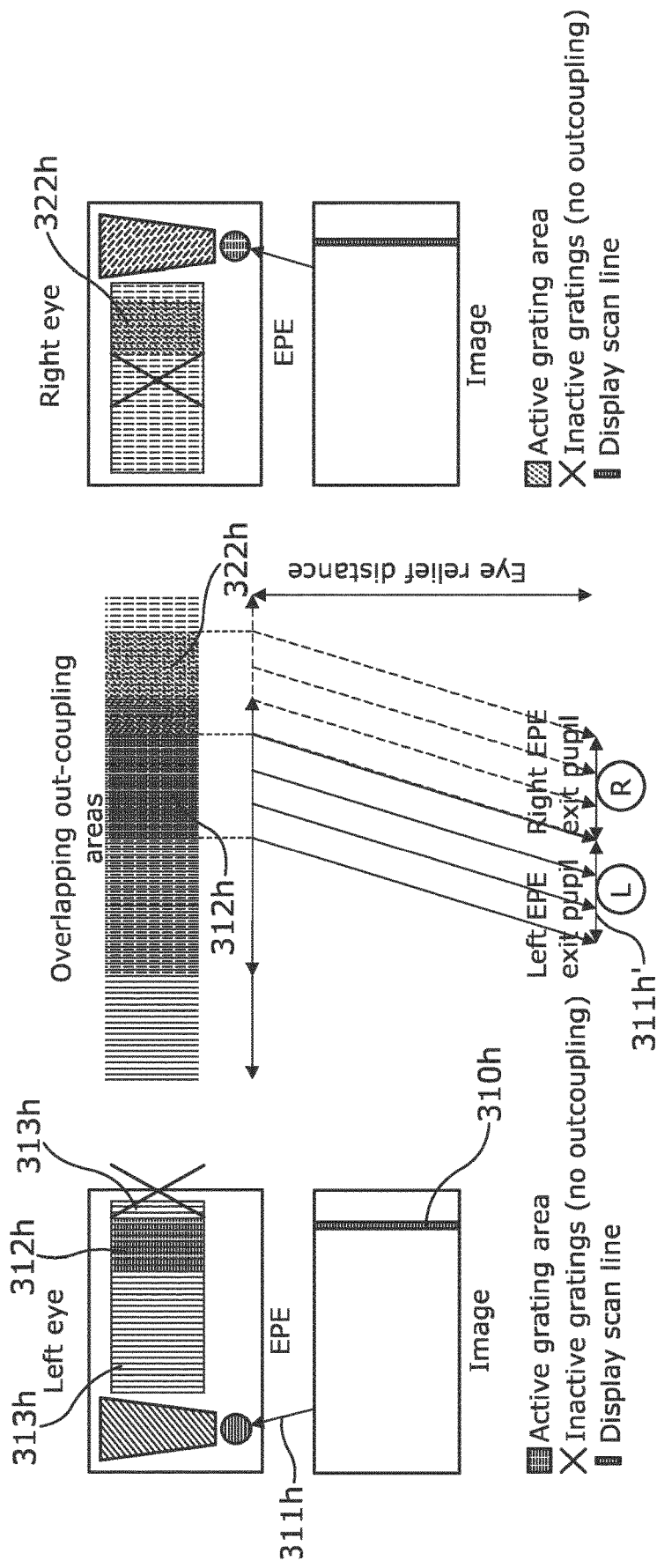
Figure 3I:
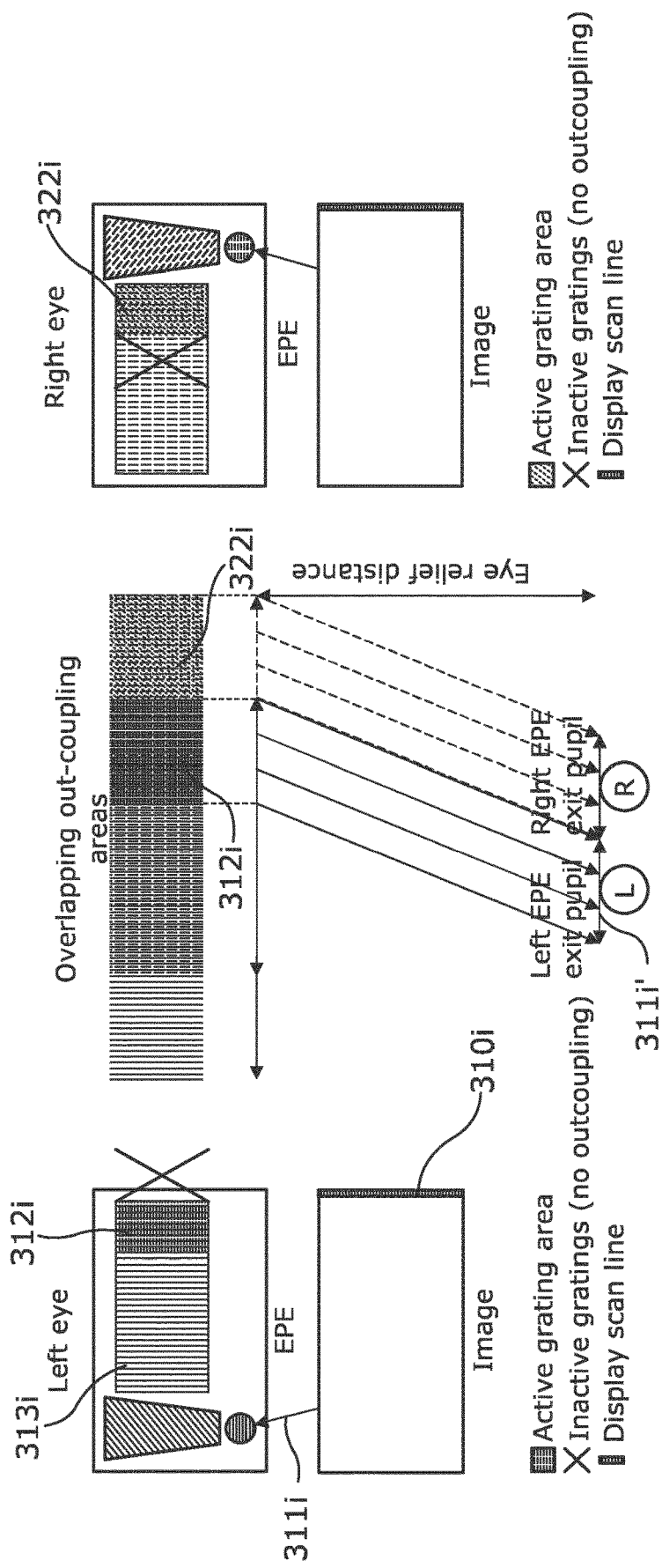

In FIG. 3B, following on from the process of FIG. 3A, another individual section 310b of the first input image 310 is projected via light beam 311b and input to the first IG of the first EPE. The projected section 310b of the first input image is expanded by the first EG of the first EPE. Another section 312b of the first OG is switched to a first/ON out-coupling state and the remaining sections 313b are switched to the second/OFF out-coupling state, such that the input light beam 311b for the section of the input image 310b is out-coupled only from the section 312b of the first OG providing an expanded output beam 311b'. A similar process happens for the setup of the right EPE and scanning projector.

In each of FIGS. 3C-I, individual sections 310c-i of the first input image 310 are sequentially and individually projected via light beams 311c-i, which are sequentially and individually input to the first IG and sequentially and individually output from sequentially switched sections 312c-i of the OG of the first EPE. In other words, at a particular instance/individual time period, a particular individual section of the first input image is projected, in-coupled, expanded and output via a particular section of the first OG. The selective switching ON/OFF of differing sections of the first OG is synchronised with the selective projections of differing sections of the first input image.

Each sequentially projected section of the first input image corresponds to a particular angle of the field of view of the exit pupil of the virtual image from the scanning projector, and each sequentially projected section in incident to the first IG with at its own differing angle of incidence.

The sequentially projected sections of the first input image are sequentially in-coupled by the IG and sequentially expanded by the first EG of the first EPE. Sections of the first OG 312c-i are sequentially switched to a first/ON out-coupling state and the remaining sections 313c-i are sequentially switched to the second/OFF out-coupling state, such that the input light beams 311c-i for the sections of the input image 310c-i are each sequentially out-coupled from respective sections 312c-i of the first OG providing a sequence of expanded output beams 311c'-i'. A similar process happens for the setup of the right EPE and scanning projector.

Such control of the scanning and projection of a sequence of individual adjacent sections of first and second input images 310, 320, and the synchronised switching of states of individual adjacent sections OG's 103, 203 (such that light beams from particular sections of the input images are out coupled from particular sections of the OG) may enable the first image 310 to be viewed (as a first output image) by the user's first eye at a first position in the user's field of view with a first expanded exit pupil, and the second image 320 to be viewed (as a second output image) by the user's second eye at a second position in the user's field of view with a second expanded exit pupil, wherein the first and second positions in the user's field of view are the same. By enabling the display of separate first and second images, that are separately perceived by each eye of the user at the same position in the user's field of view, stereoscopic/3D content is able to be displayed and perceived by the user via the OG's.

Whilst examples have been discussed with one first EPE and one second EPE, it is to be appreciated that in some examples, there may be plurality of first EPE's (e.g. configured to increase the field of view of the expanded exit pupil, and/or configured to diffract certain specific ranges of wavelength/frequency/colours of light).

It is also to be appreciated that the apparatus can also be fully or partially operable in a 2D mode. For example, when all or a selected subset of the sections of the first and second OG's are switched ON, the system can fully or partially work as a standard 2D stacked EPE based HUD. In such a 2D mode, or inside the 2D regions, portions of the display area where the first and second OG's overlap, the maximum luminance output would be increased (i.e. doubled) and also image uniformity can be increased.

FIGS. 4A-4I illustrate an example of the subject matter described herein. Instead of having full overlap with the left and right-side field of views (as per FIGS. 3A-I), the system is configured with partial stereoscopic coverage. The out-coupling areas overlap less than in FIGS. 3A-I and the projectors have only partly overlapping field-of-views in the centre of the complete FOV. In such a system, image content near the left and right edges originate from just one EPE and hence is observed as 2D.

FIGS. 4A-4I illustrate how a partial stereoscopic image is displayed to a user (e.g. wherein a central portion of the output image/central portion of the FOV displayed to the user is able to be perceived in 3D, whereas the side portions of the output image/side portions of the FOV are perceived in 2D) via a system comprising: an apparatus 10' and two projectors (not shown).

The apparatus 10' is somewhat similar to the apparatus 10 described above with respect to FIGS. 1A and 3A-I in that it comprises two stacked EPE's 100, 200 each with switchable OG's 103, 203. However, the apparatus 10' differs in that the degree of overlap of the OG's is less. In FIGS. 4A-I, the size of the (central) portion overlapping portions of OG's is smaller than in FIGS. 1 and 3A-I. Also, the size of the (left) side end portion of the first OG which is not overlapped by any of the second OG is larger than in FIGS. 1 and 3A-I, and likewise the size of the (right) side end portion of the second OG that is not overlapping any of the first OG is larger than in FIGS. 1 and 3A-I.

FIGS. 4A-4I illustrate the process for controlling the projection of the input beams of the source input images that are incident to each EPE and the simultaneously control of the out-coupling states of the first and second OG's.

The system of FIGS. 4A-4I is configured such that the first input image 410, projected by the first scanning projector and output by the first OG, is perceived having a first position and a first size within the user's field of view; and the second input image 420, projected by the second scanning projector and output by the second OG, is perceived having a second position and size within the user's field of view where the second position is different from the first position. In this regard, two virtual output images (that are respectively perceived via the two exit pupils) may be considered to partially overlap in the user's field of view, or, to put it another way, the projectors have partially overlapping fields of view.

Furthermore, in the process of FIGS. 4A-4I, rather that the whole of the first input image 410 being scanned and projected to the first EPE one section/scan line at a time, instead only a part 410' of the first input image is scanned and projected to the first EPE one section/scan line at a time, and a remaining portion 410" is not scanned and projected to the first EPE one section/scan line at a time. Likewise, rather that the whole of the second input image 420 being scanned and projected to the second EPE one section/scan line at a time, instead only a part 420' of the second input image is scanned and projected to second first EPE one section/scan line at a time, and a remaining portion 420" is not scanned and projected to the second EPE one section/ scan line at a time.

Figure 4A:
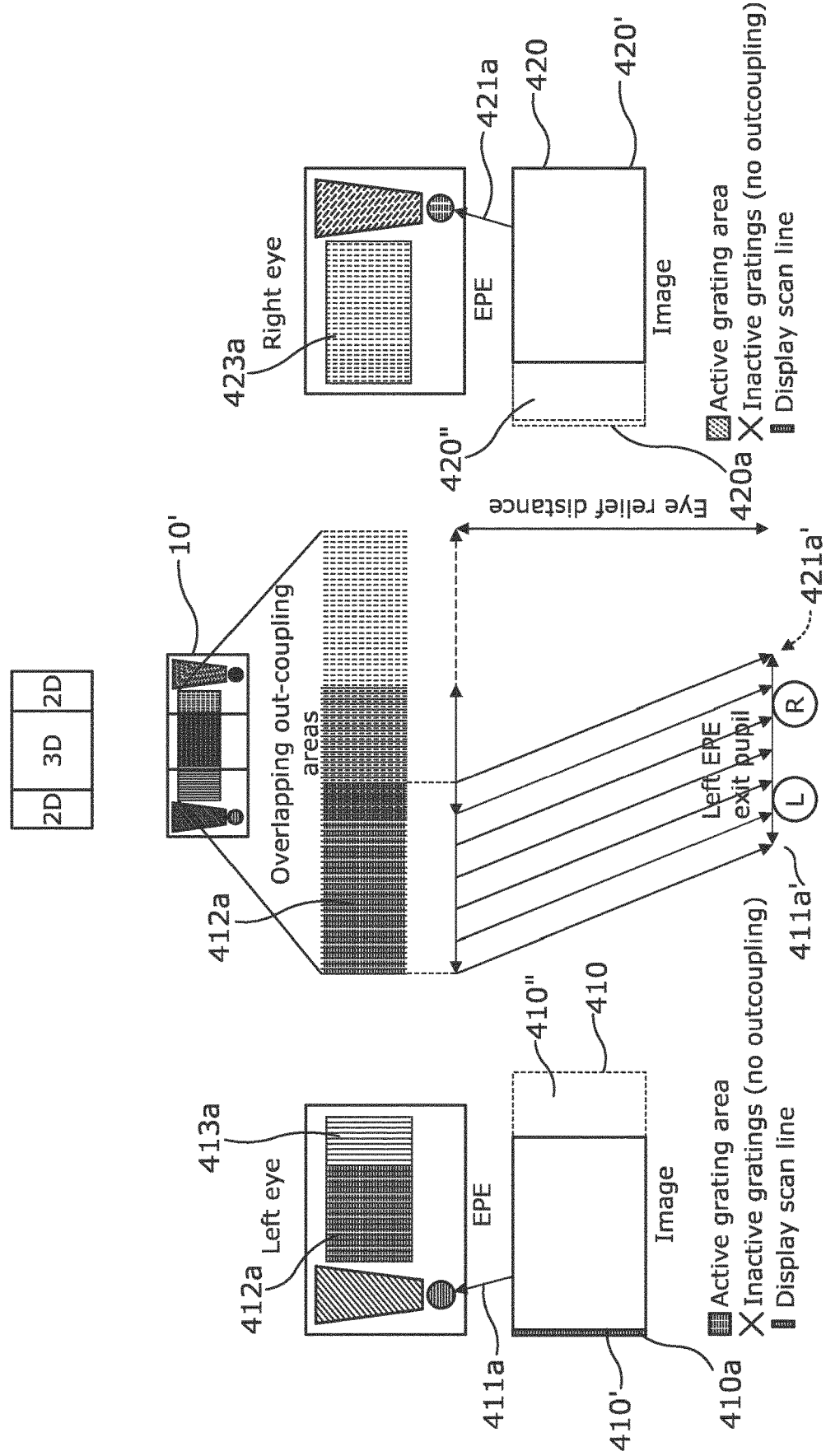
FIGS. 4A-4I show another example of the subject matter described herein.

FIG. 4A shows a first section 410a of the first input image 410. A first scanning projector (not shown) is configured such that the individual section 410a of the first input image 410 is projected via light beam 411a and input to the first IG of the first EPE. The projected section of the first image is expanded by the first EG of the first EPE. A section 412a of the first OG is selected and switched to a first/ON out-coupling state, and the remaining sections 413a are switched to the second/OFF out-coupling state. This ensures that the input light beam 411a for the section of the input image 410a is out-coupled only from the ON section 412a of the first OG, thereby providing a first expanded output beam 411a' whose dimension is based in part on the size of the ON section 412a of the first OG. Significantly, the size of the ON section 412a is set such that size of the expanded beam is encompasses both of the user's first and second eyes. In other words, the exit pupil of the first EPE for the first (left-hand most) side of the output image is sufficiently large to encompass both of the user's eyes, i.e. the exit pupil is large enough to cover both of the user's eyes.

By contrast, the equivalent left hand most section 420a of the input image 420 is within the part 420" of the input image that is not scanned and projected. Therefore, there is no scanning and projection of a light beam 421a corresponding to such a section of the second input image that is input to the EPE and output to the user's second eye, i.e. there is no output image form the second EPE setup. The whole of the second OG, all of its sections 423a can be switched to the second/OFF out-coupling state.

Hence, the user's second eye received light only from the first EPE and the user's second eye sees the first output image corresponding to the first section of the first input image (corresponding to a far left/left-hand most field of view of the first input image). Consequently, the section of the output virtual image that is perceived by the first and second eyes in FIG. 4A is 2D (i.e. no disparity/parallax).

Figure 4B:
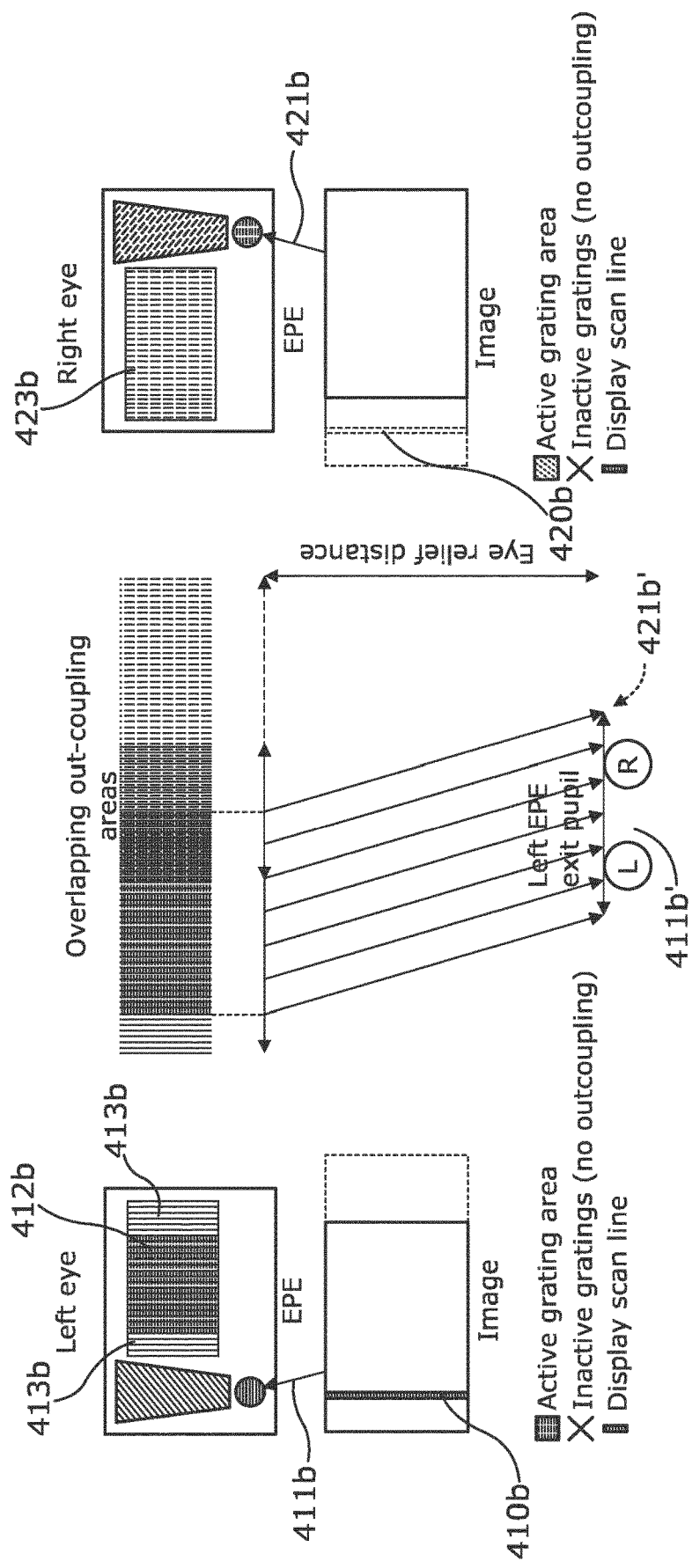

FIG. 4B illustrates a subsequent section of the first input image being individually projected, input to the first IG and output from the next section of sequentially switched sections of the OG of the first EPE. Again, the size of the sections of the first OG that are switched to be ON is selected such that the output expanded beam encompasses both of the user's first and second eyes, and no part of the second input image is projected, input, expanded and output by the second EPE setup. Consequently, the section of the output virtual image that is perceived by the first and second eyes in FIG. 4A is 2D.

Figure 4C:
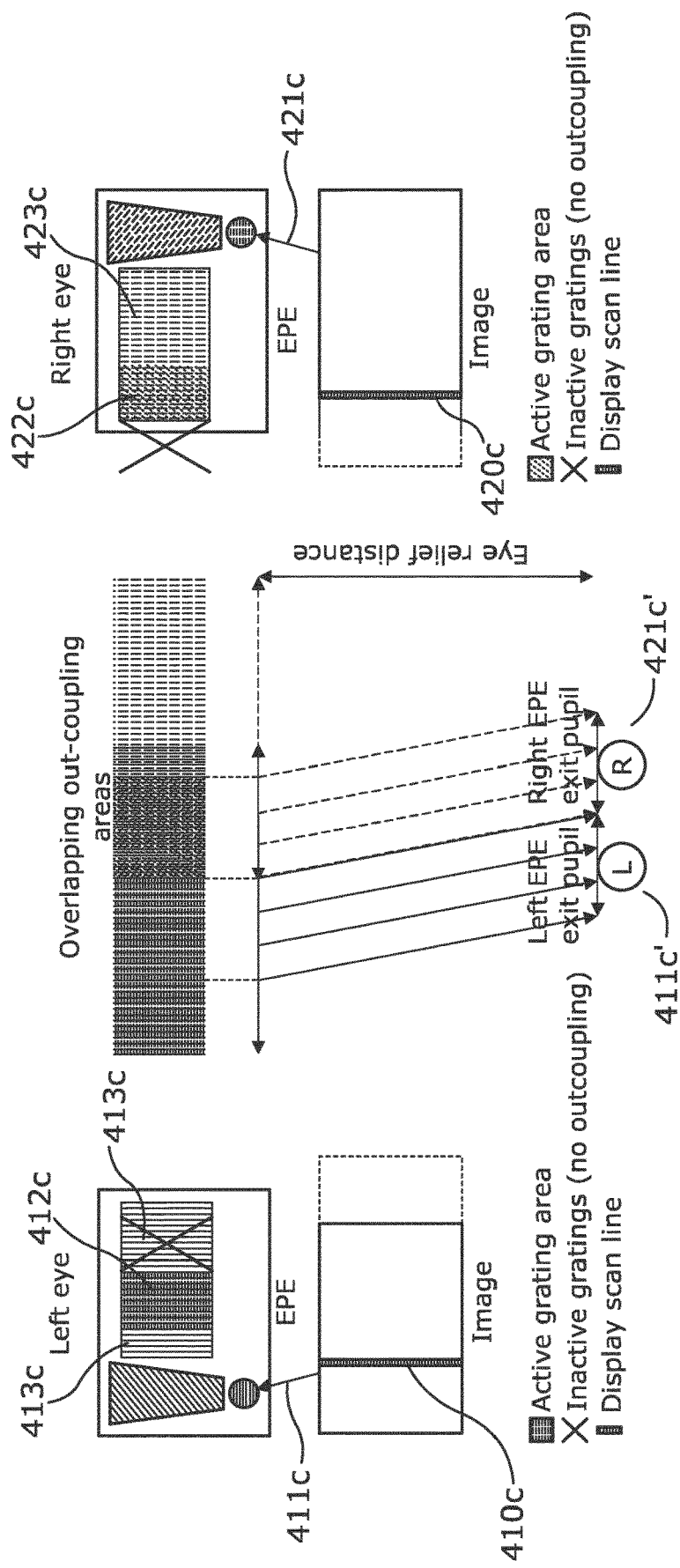
Figure 4D:
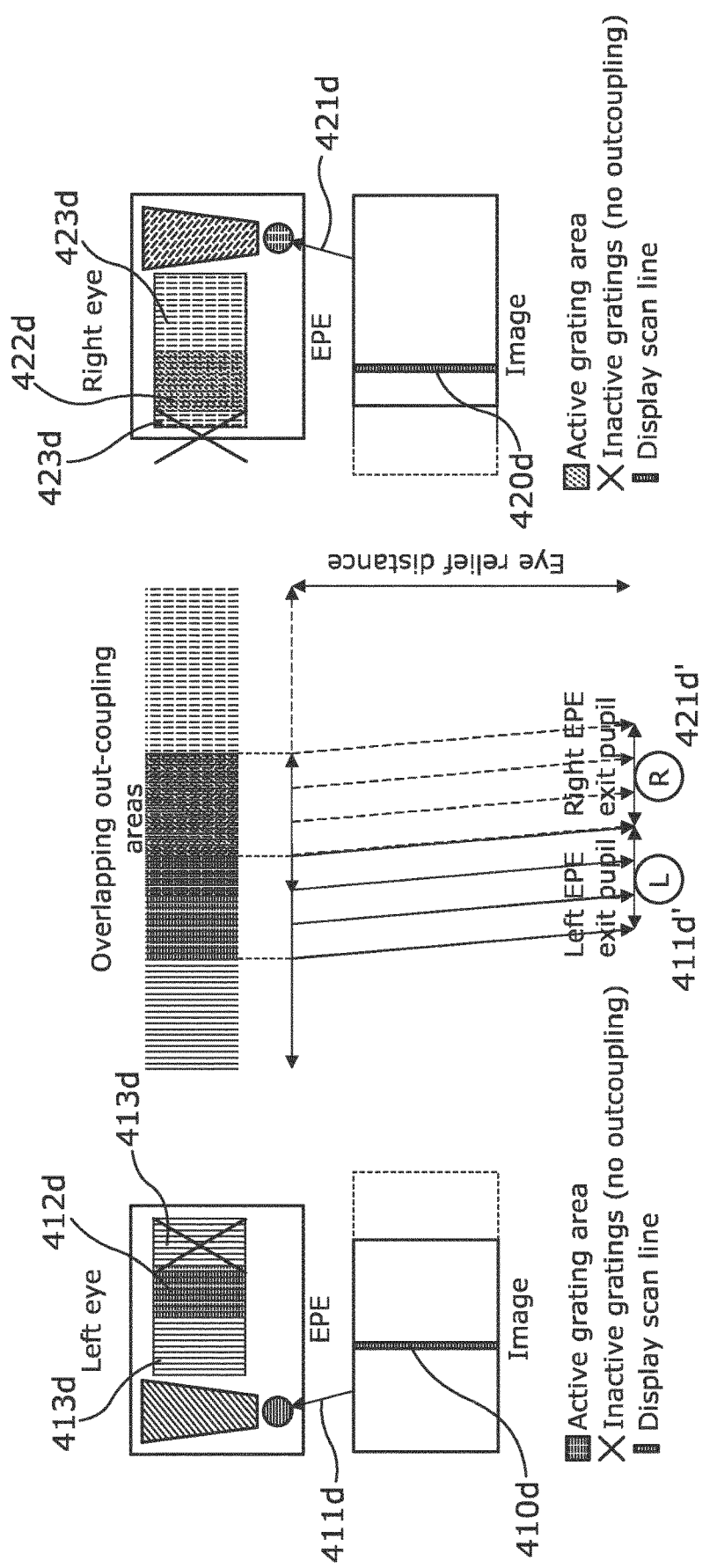
Figure 4E:
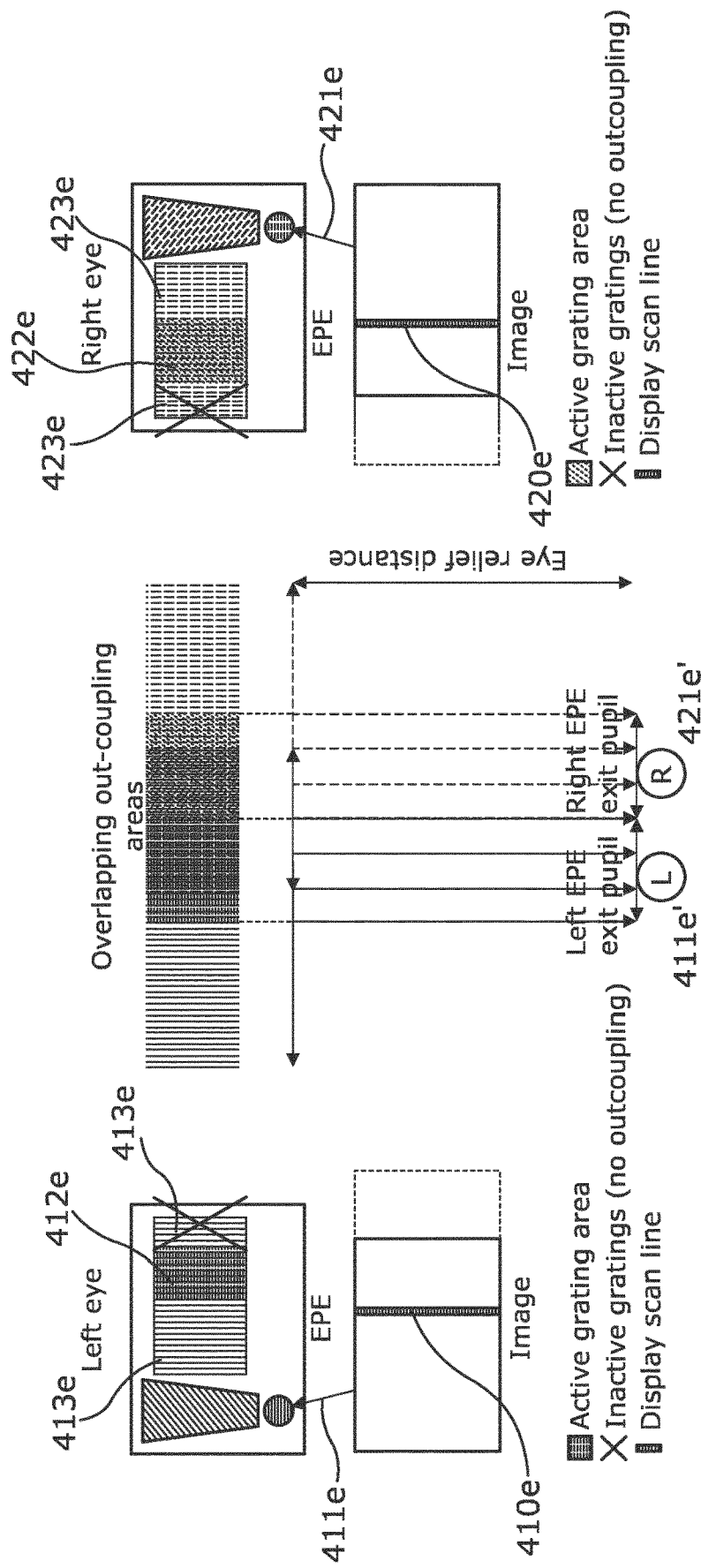
Figure 4F:
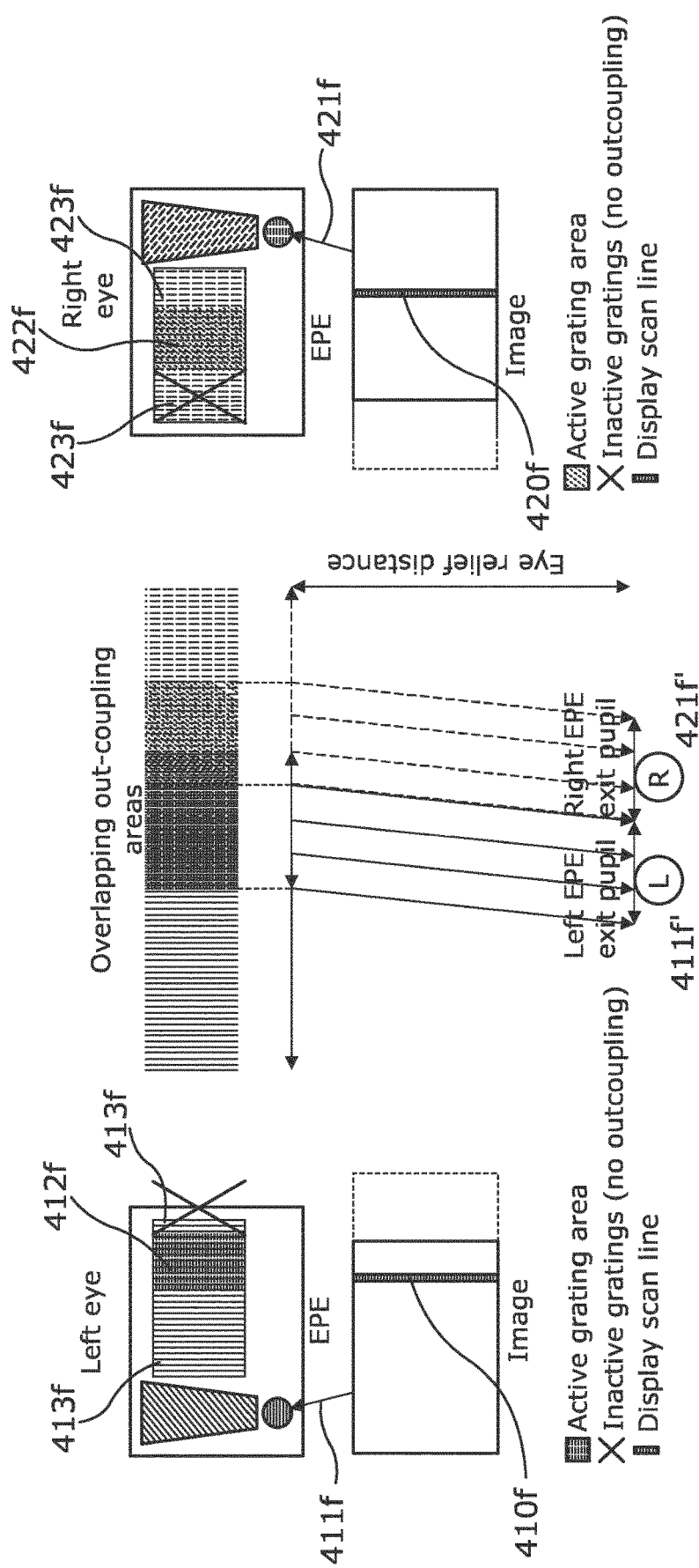
Figure 4G:
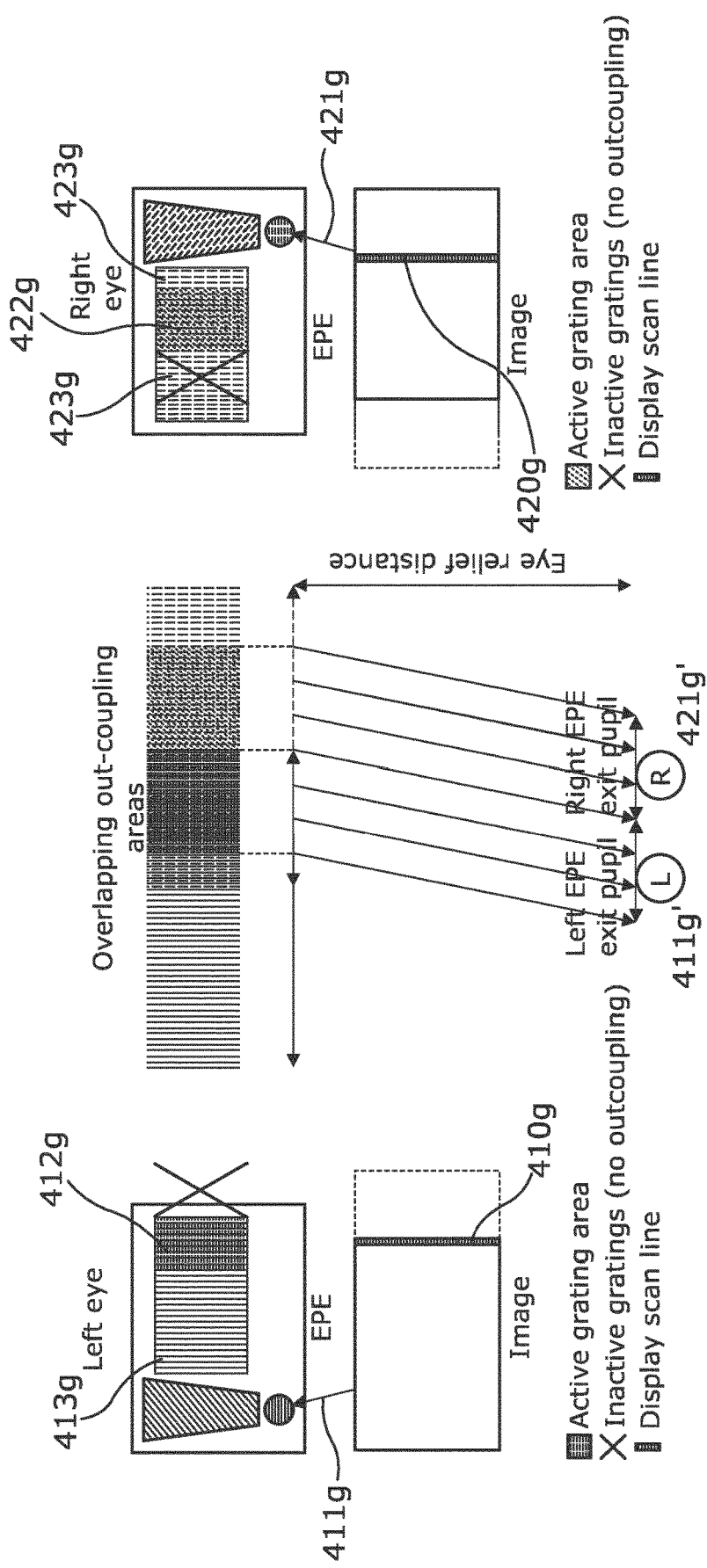

FIG. 4C illustrates a yet further subsequent section 410c of the first input image 410 being individually projected, input to the first IG and output from next section 412c of sequentially switched sections of the OG of the first EPE. However, the size of the section 412c of the first OG that is switched to be ON is selected such that the output expanded beam 411c' encompasses just the user's first eye. The equivalent section 420c of the second input image is individually projected, input to the second IG and output from a section 422c of sequentially switched sections of the OG of the second EPE. The size of the section 422c of the first OG that is switched to be ON is selected such that the output expanded beam 421c' encompasses just the user's second eye.

Consequently, the section of the output virtual image that is perceived by the first and second eyes in FIG. 4C is 3D.

In each of FIGS. 4D-G, individual sections 410d-g of the first input image 410 are sequentially and individually projected via light beams 411d-g, which are sequentially and individually input to the first IG and sequentially and individually output from sequentially switched sections 412d-g of the OG of the first EPE. Similarly, individual sections 420d-g of the second input image 420 are sequentially and individually projected via light beams 421d-g which are sequentially and individually input to the second IG and sequentially and individually output from sequentially switched sections 422d-g of the OG of the second EPE.

Figure 4H:
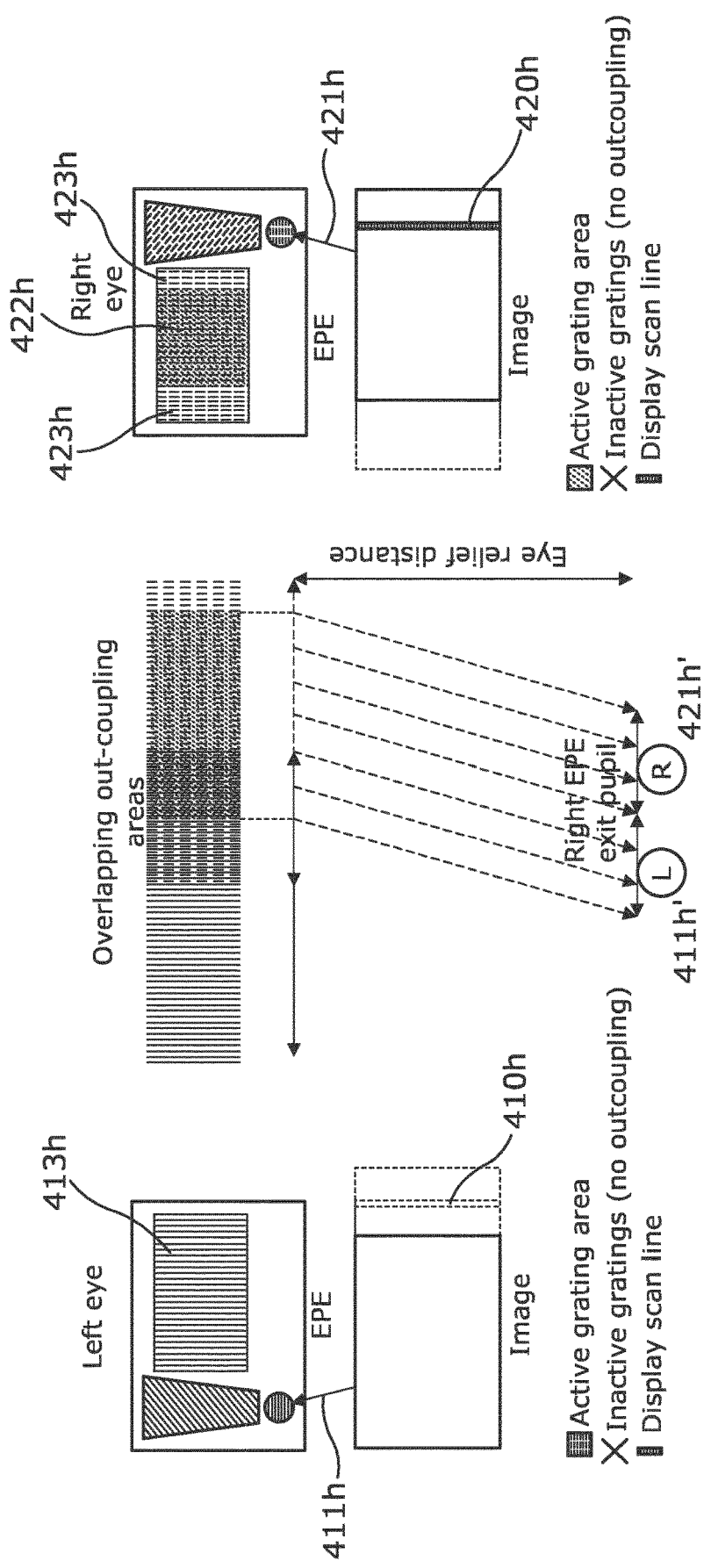
Figure 4I:
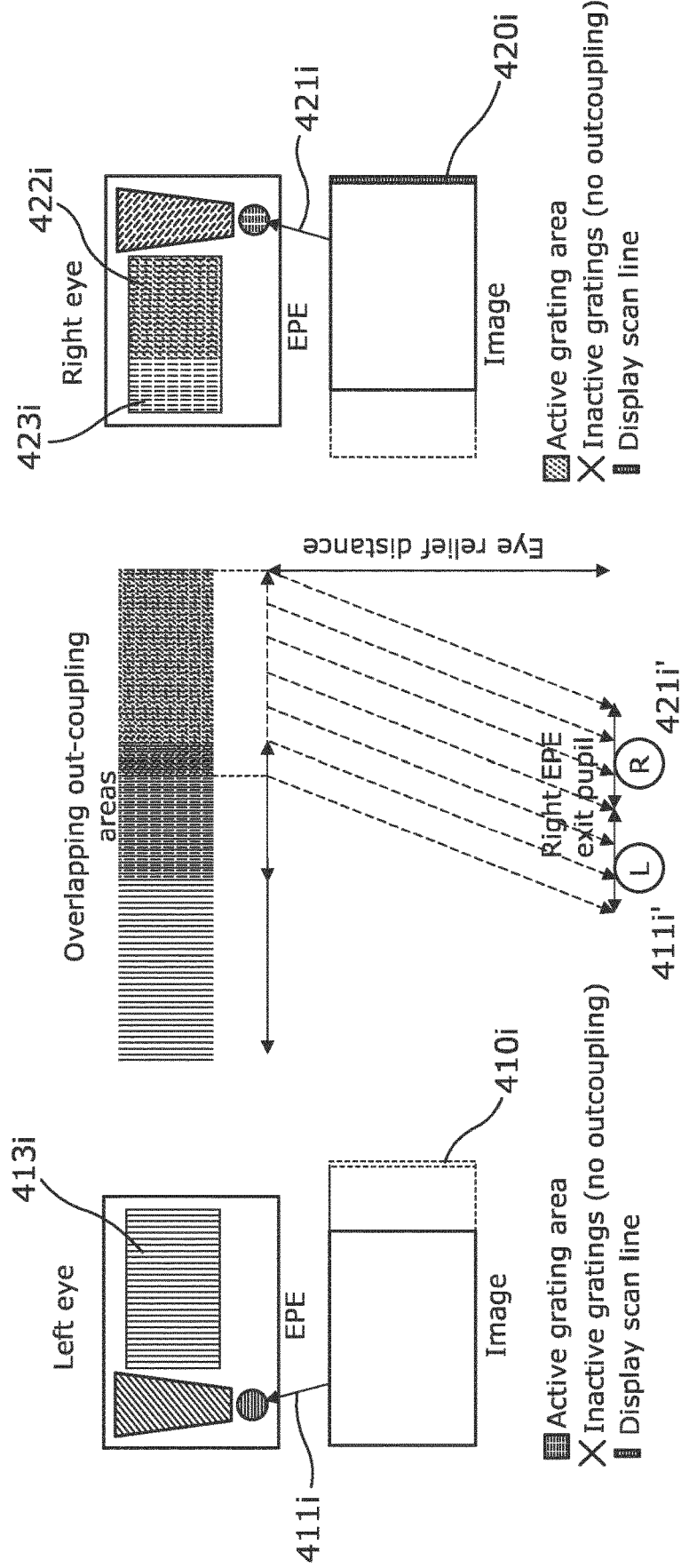

In FIGS. 4H and 4I, a process occurs that mirrors that of FIGS. 4A and 4B, with wherein sections of the second input image are individually projected, input to the second IG and output from respective switched ON sections of the OG of the second EPE, and wherein the size of the sections of the second OG that are switched to be ON is selected such that the output expanded beam encompasses both of the user's first and second eyes. No part of the first input image is projected, input, expanded and output by the first EPE setup. Consequently, the section of the output virtual image that is perceived by the first and second eyes in FIGS. 4H and 4I is 2D.

Figure 5A:
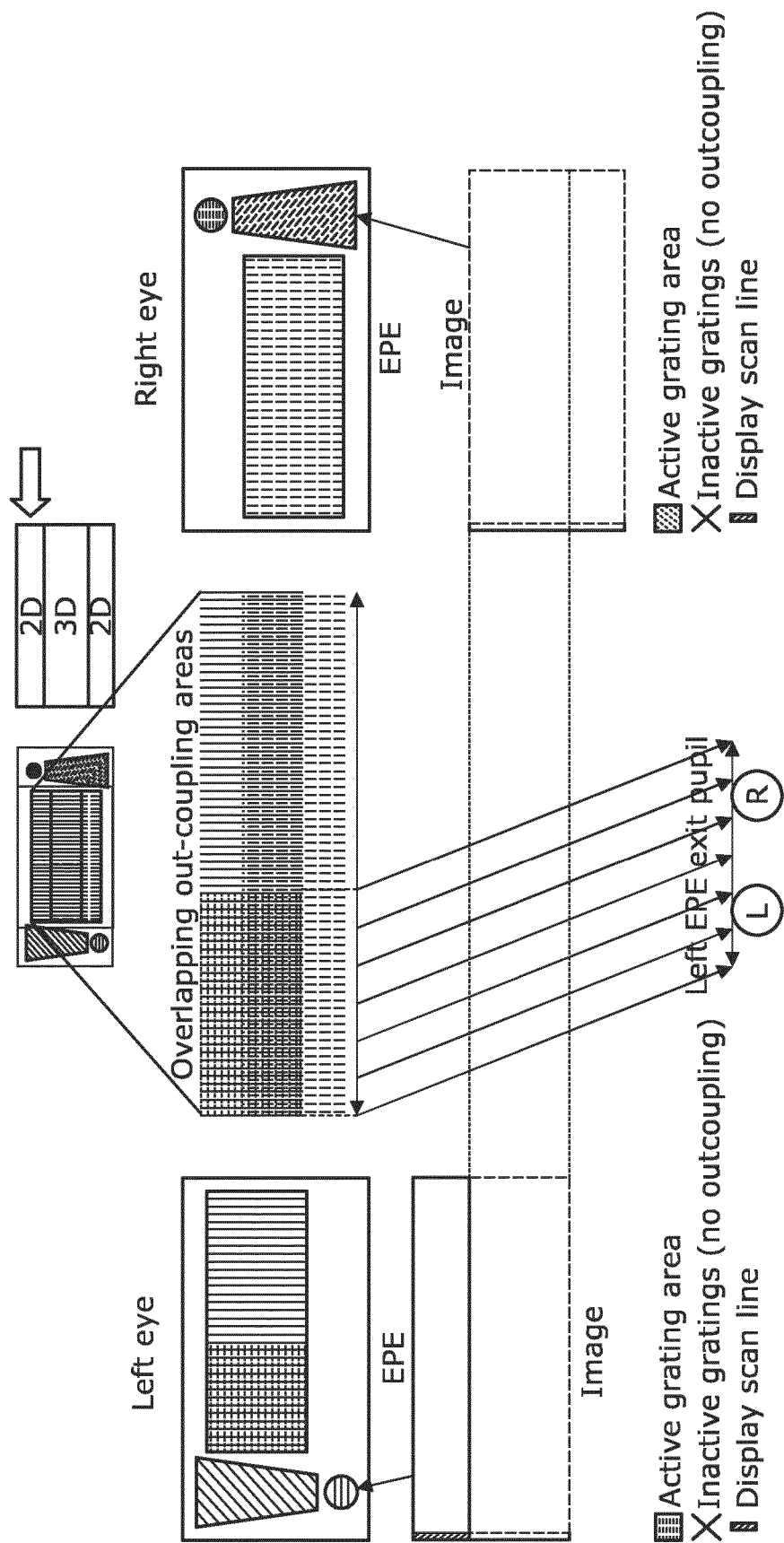
FIGS. 5A-5C show another example of the subject matter described herein.
Figure 5B:
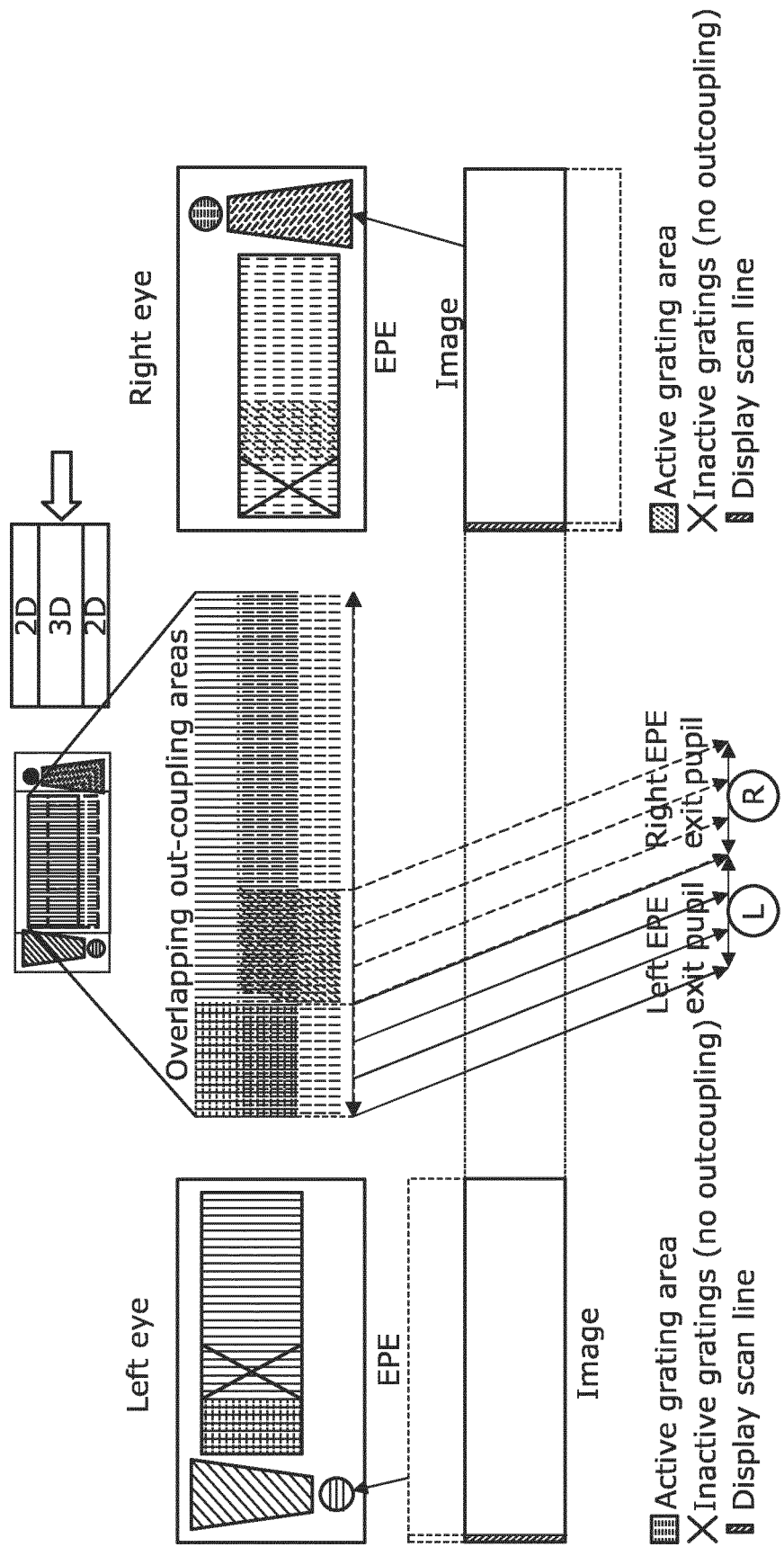
Figure 5C:
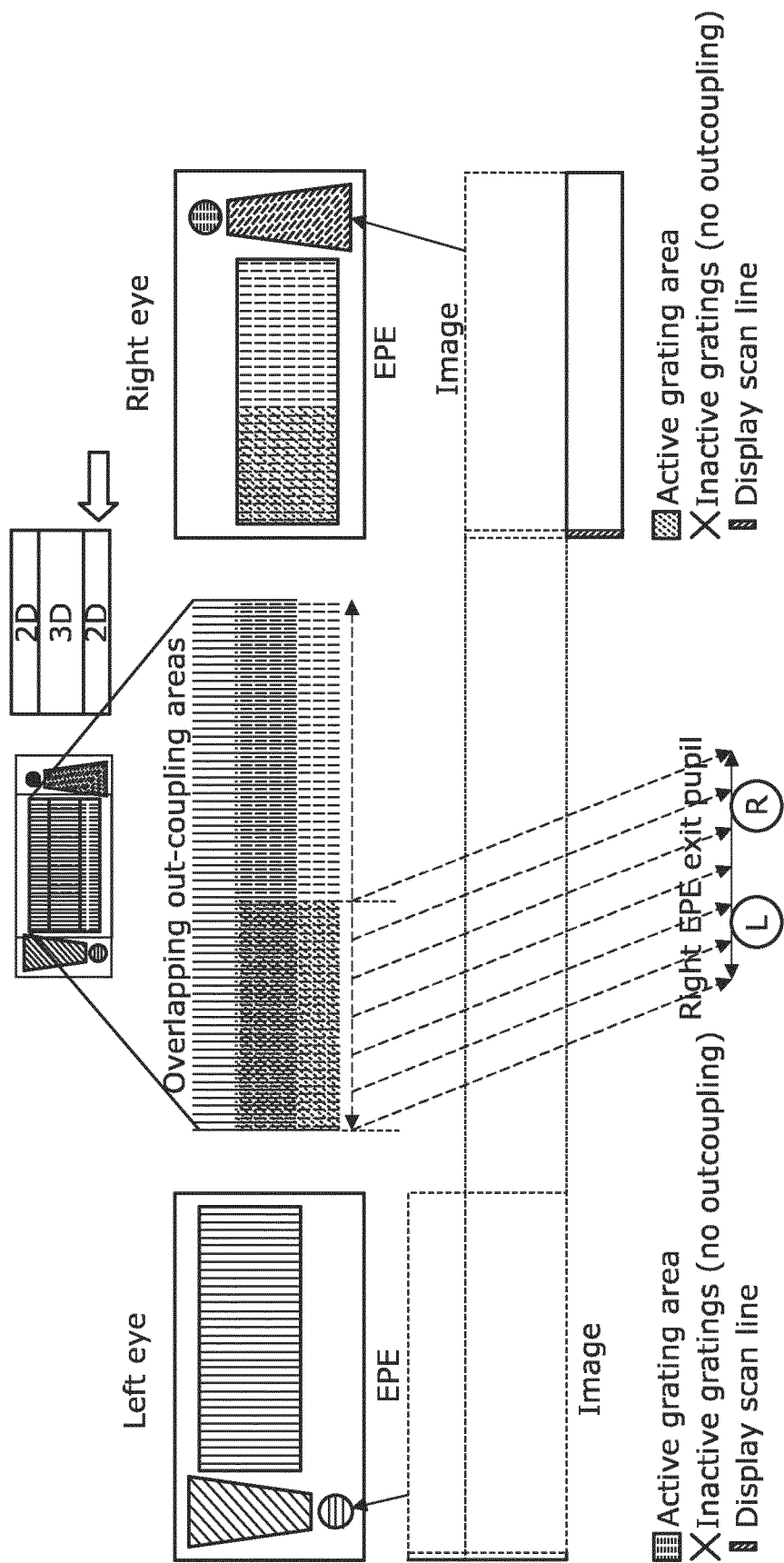

FIGS. 5A-5C illustrate an alternative way in which a partial stereoscopic image can be displayed to a user. In the system of FIGS. 5A-C, a stereoscopic area of the overlapping output virtual images observed by the user (i.e. where 3D content is perceived) is in the centre of the overlapping output virtual images, while 2D areas are at the top and bottom part of the field-of-view of the overlapping output virtual images. The overlap of the first and second OG, as well as the displayed output image contents have a vertical offset.

In FIGS. 4A-I, the first and second OG's overlapped in a horizontal direction, i.e. such that a left-side portion of the first OG is not overlapped by any of the second OG, and a right-side portion of the second OG is not overlapping any of the first OG. By contrast in FIGS. 5A-C, the first and second OG's overlap in a vertical direction, i.e. such that an upper-side portion of the first OG is not overlapped by any of the second OG, and a lower-side portion of the second OG is not overlapping any of the first OG.

With the system of FIGS. 5A-C, by selectively controlling, for each of the first and second EPE setups, which particular sections of an input image are projected at a given time and synchronising this with which particular sections of the OG's are switched ON (and which particular sections are switched OFF) and any given time, a central portion of the output image displayed to the user via the system can be perceived in 3D, whereas the upper and lower portions of the output image are perceived in 2D.

FIGS. 6A-D illustrate different user positions and how the system adapts to the same. These FIGs illustrate a process for selectively scanning and projecting sections of the first and second input images and selectively switching the first and second OG so as to adjust the position of the output expanded first and second beams, e.g. so as to move the same (and move the exit pupils) so as to be aligned with the user's eyes.

The user's head position, e.g. relative to the apparatus, can be determined and tracked, such as with a camera or any other suitable tracking means. By adjusting which sections of the OG are switched ON for a particular section of the input image scanned and projected to the EPE, the exit pupil positions can be controlled and dynamically adjusted to follow the head/user's eyes in any direction.

Figure 6A:
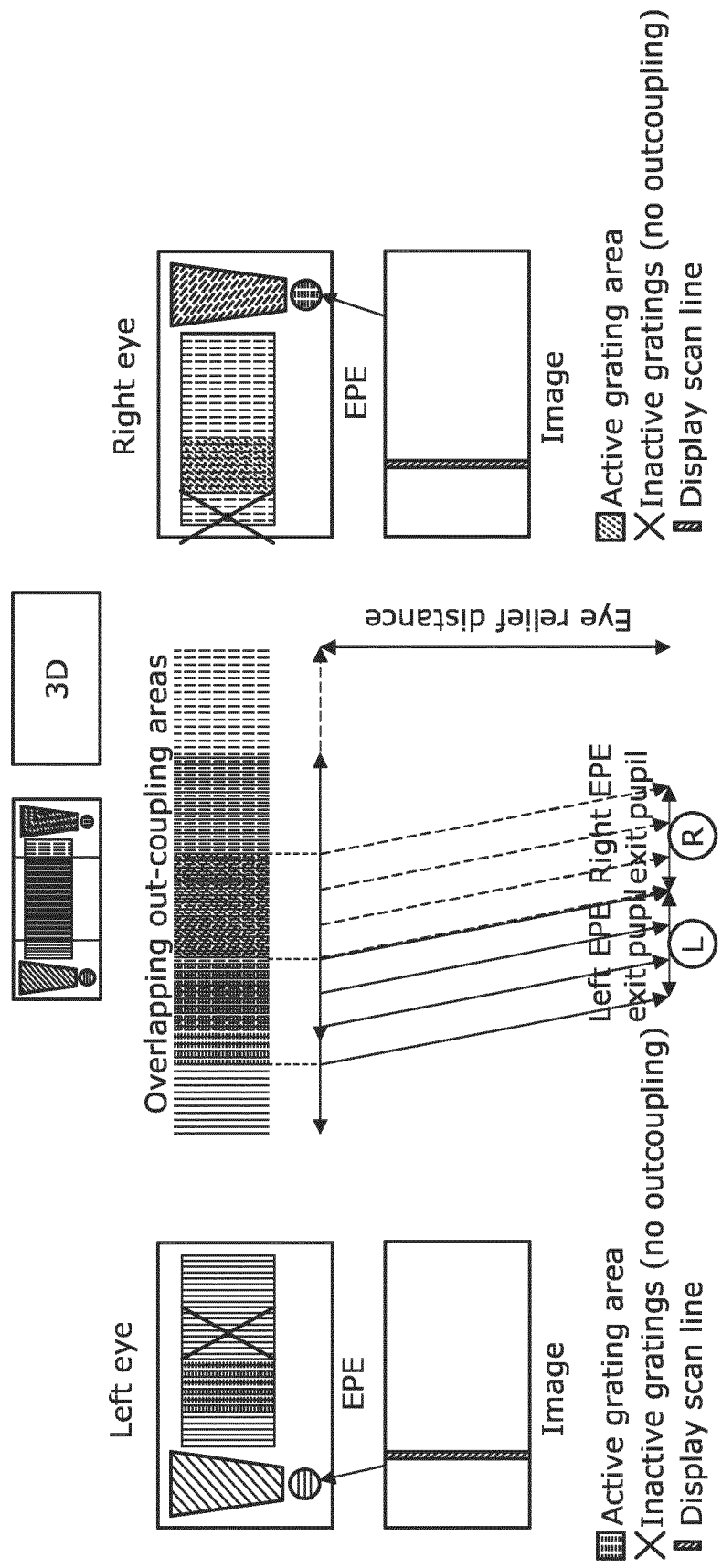
FIGS. 6A-6D show another example of the subject matter described herein.
Figure 6B:
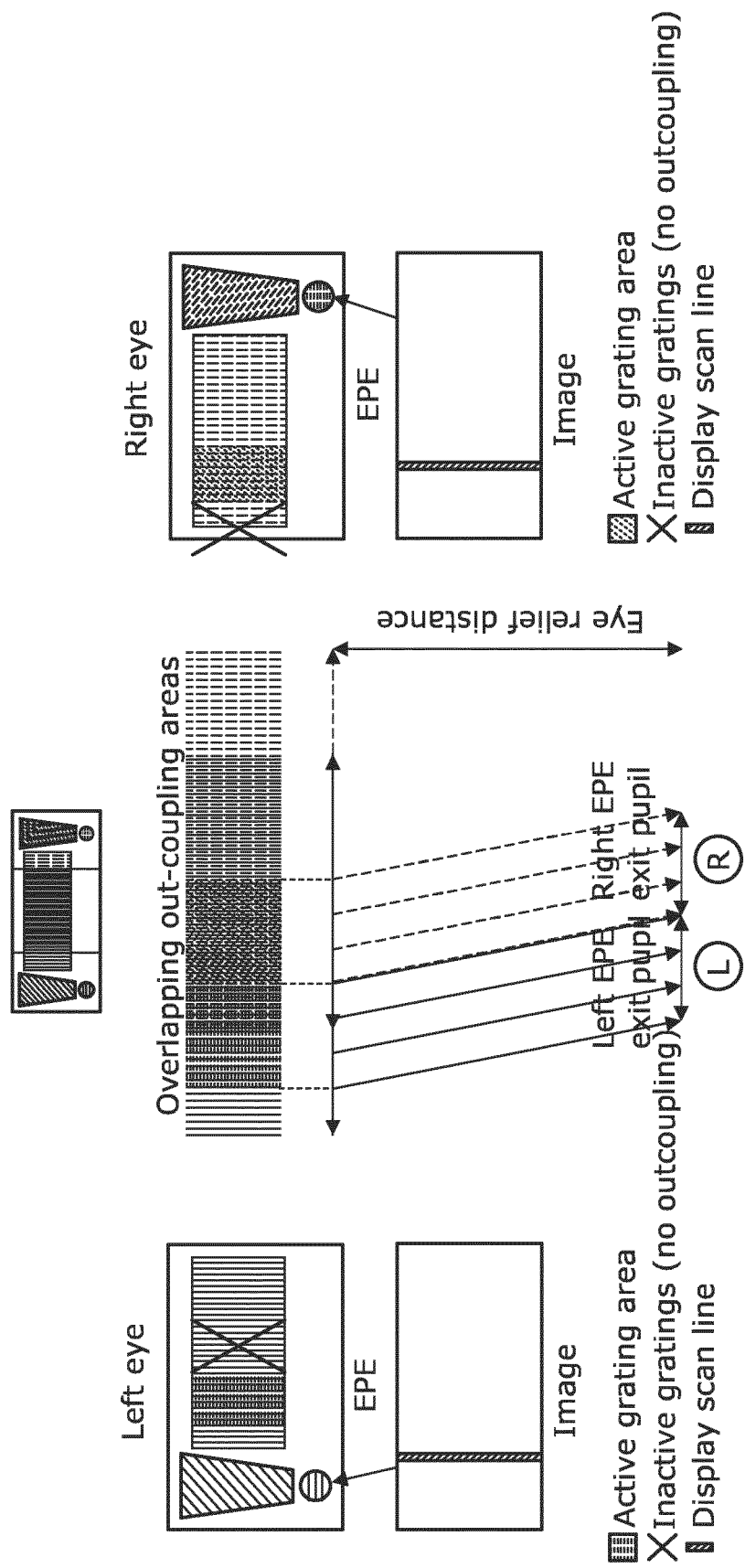

In FIG. 6B, the user's head (and eyes) have moved slightly to the left. To compensate for this and adjust the position of the first and second exit pupils so that they remain aligned with the user's first and second eyes, the particular section of the first and second OG's that is switched ON for the particular section of the input image is adjusted (moved to the left) whilst the section of the first and second input image being scanned and projected remains the same. Hence the association of which particular section of an OG is switched on for a particular section of the input image is adjusted.

Figure 6C:
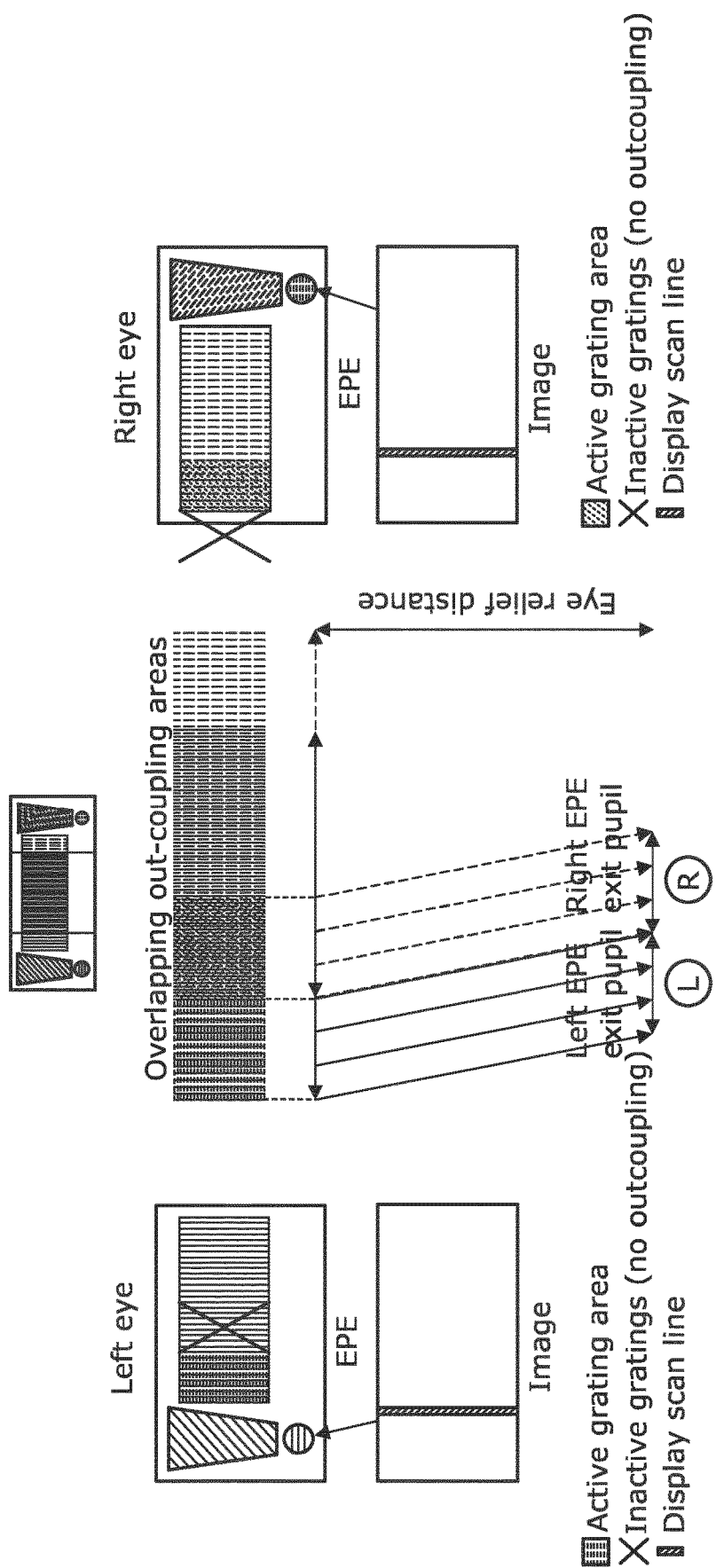

In FIG. 6C, the user's head/eyes have moved slightly further to the left. To compensate for this, and adjust the position of the first and second EPE's first and second exit pupil positions respectively to align with the user's eye's position, an adjustment is made as to the sections of the first and second OG's that are switched ON for particular sections of the first and second input image being scanned and projected.

For example, for each of FIGS. 6A-C, the particular sections of the first and second input image being scanned and projected remain the same, whilst the sections of the first and second OG's that are switched ON for these same sections is adjusted. In other words, there is a change in the association of which sections of the first and second OG's are to be ON for particular sections of the first and second input image being scanned and projected.

Figure 6D:
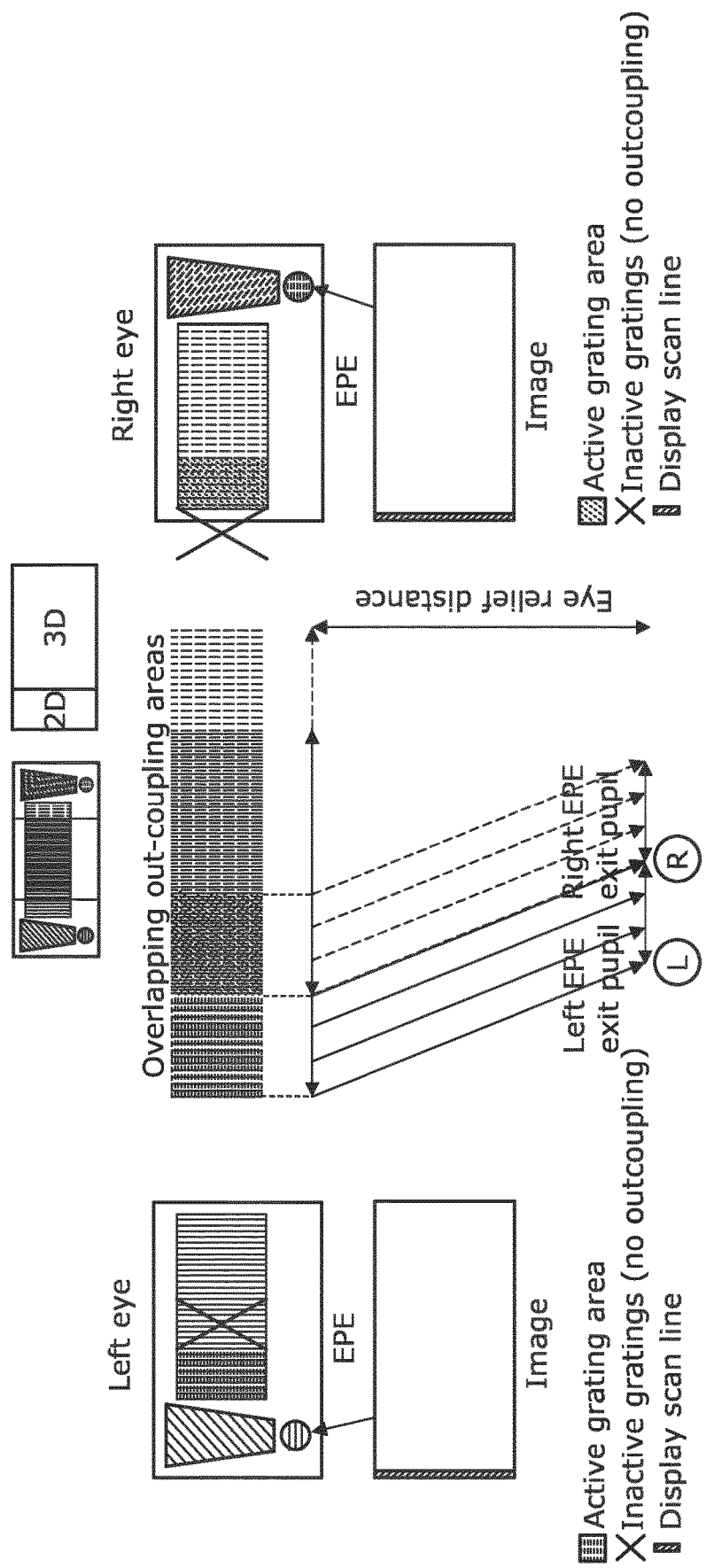

FIG. 6D, illustrates a scenario wherein, when the user continues to move to left, at some stage the right EPE can no longer output the left edge of the input image into the (shifted) exit pupil. In which case, it is possible to turn this portion of the image/FOV to 2D such that only the left EPE displays that part of the input image/FOV. As shown in FIG. 6D, when the user's head/eyes have moved yet further to the left, to seek to compensate for this, and adjust the position of the first and second EPE's first and second exit pupil positions respectively to align with the user's eye's position, an adjustment is made as to the sections of the first and second OG's that are switched ON for particular sections of the first and second input image being scanned and projected. However, in spite of the extreme left hand most section of the second OG being ON, the position of the second exit pupil is not aligned/does not overlap/encompass the user's right eye. Instead, the position of the first exit pupil from the first EPE encompass both the user's left and right eyes—hence 2D content would be perceived by the user for the left-hand most part of the input image/FOV.

Figure 7A:
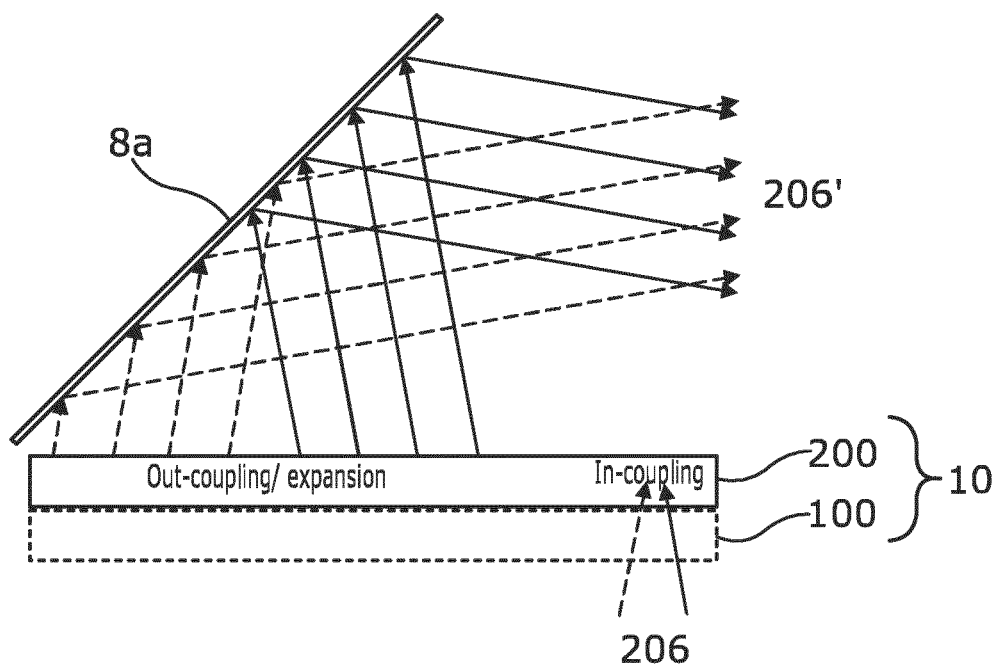
FIGS. 7A-7C show another example of the subject matter described herein.
Figure 7B:
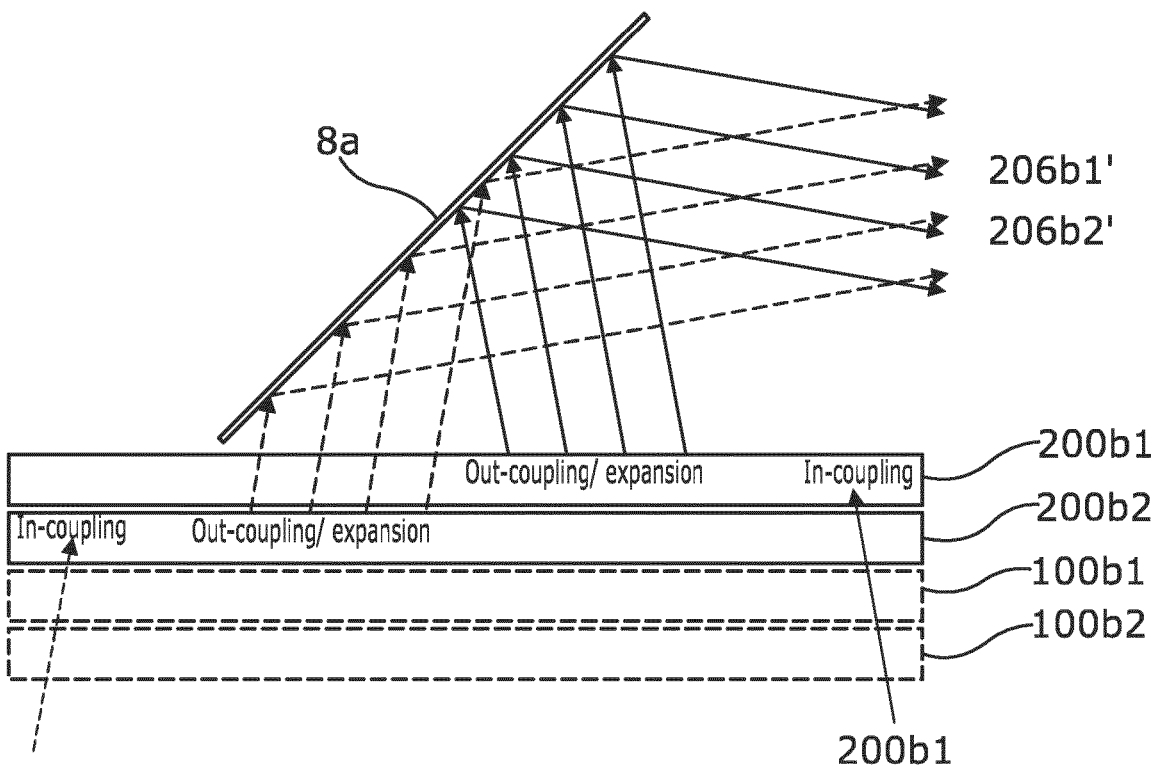
Figure 7C:
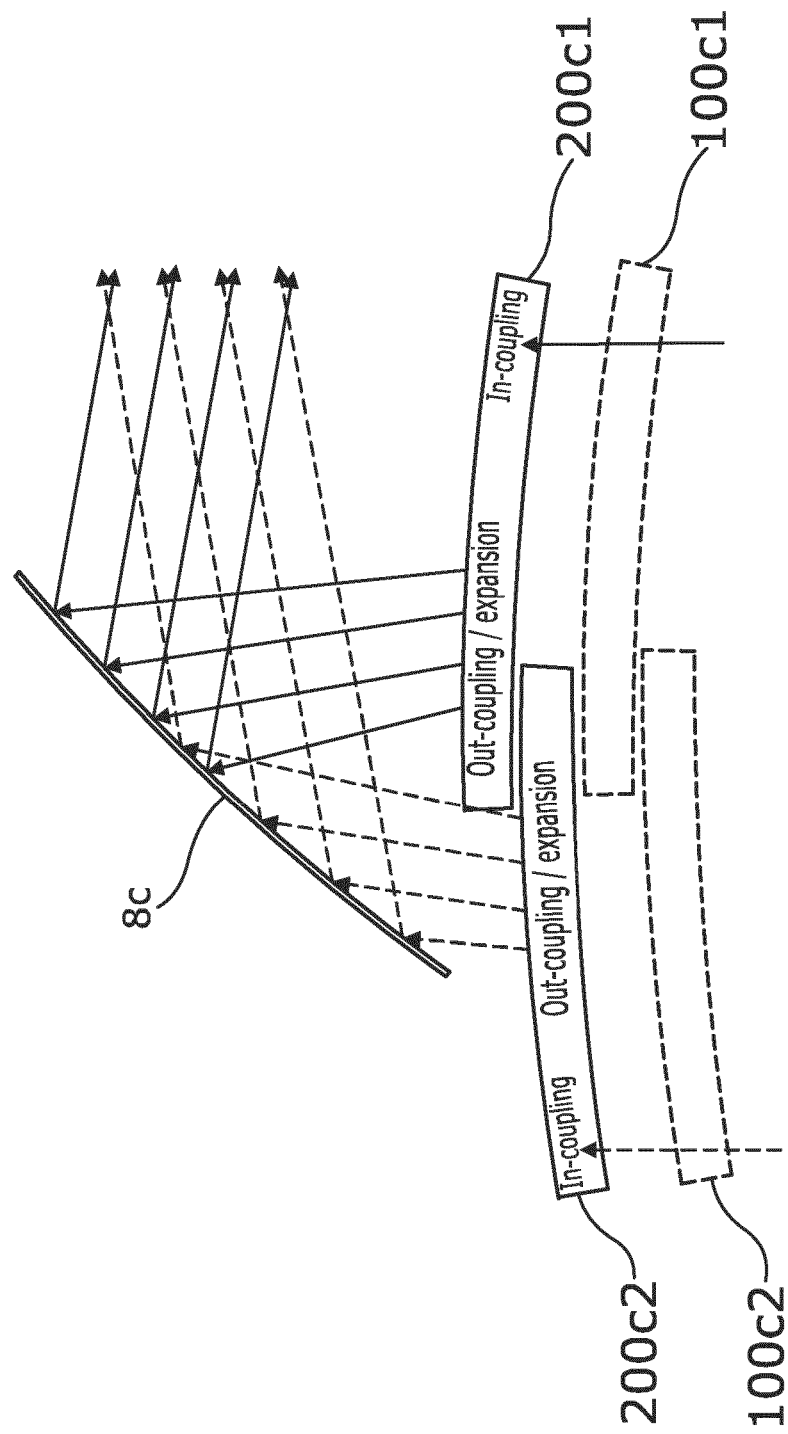

FIGS. 7A-C schematically illustrate certain examples configurations of the apparatus that additionally utilise an optional reflecting combiner. The orientation of the reflecting combiner in these FIGs is not to be taken literally (the reflecting combiner should be considered as being rotated 90 degrees so that the rays would reflect outwards of the page rather than to the right of the page as shown).

In FIG. 7A the output beams/images 206' are reflected from a planer combiner/reflector 8a.

In FIG. 7B instead of there being only a single first EPE and a single second EPE, a plurality of first EPE's 100b1, 100b2 and a plurality of second EPE's 200b1, 200b2 may be provided that are stacked on top of one another and/or at least partially overlapping. The use of plural first and second EPE's may be configured to provide an increase in the field of view of the expanded exit pupils, and/or provide DOE's in each EPE that is optimised to diffract certain specific ranges of wavelength/frequency/colour of light so as to improve the in-coupling, expanding and out-coupling efficiency of the DOE's for particular wavelengths/frequencies/colours.

In FIG. 7C, a curved combiner/reflector 8c is used. The stacked EPE's 100c1, 100c2, 200c1, 200c2 are configured to compensate for the curvature of the combiner/reflector 8c and the optical power thereof by adjusting the light beam output therefrom. In this regard, the stacked EPE's may themselves be curved to compensate for the optical power of the curved combiner/reflector.

Figures 8, 9:
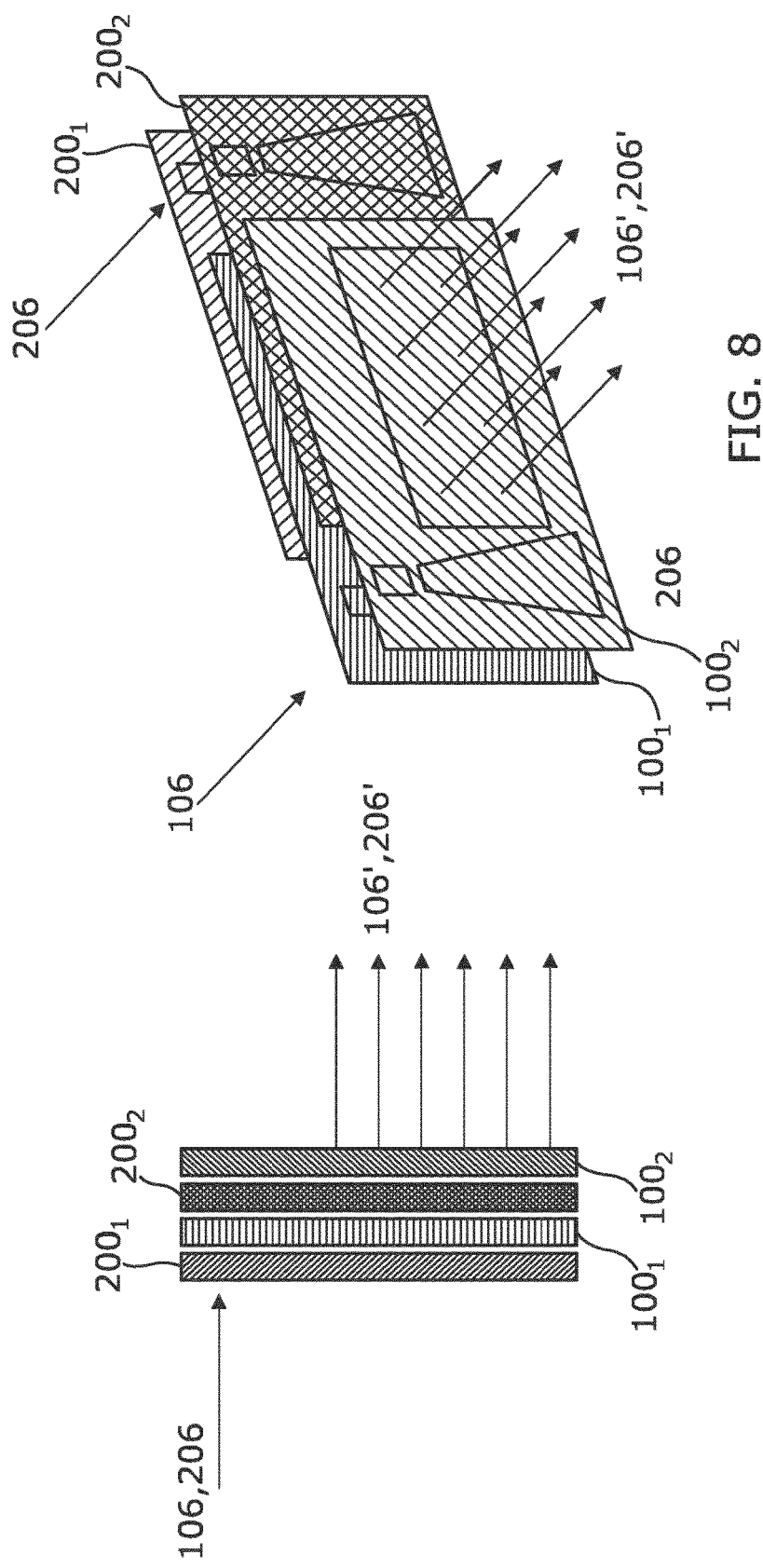
FIG. 8 shows another example of the subject matter described herein.
FIG. 9 shows another example of the subject matter described herein.

FIG. 8 illustrates an apparatus comprising plural first EPE's 100$_1$, 100$_2$ and plural second EPE's 200$_1$, 200$_2$ that interleave one another. The various EPE's can be interleaved in any order.

FIG. 9 illustrates a method according to an example of the disclosure.

In block 1001, at least partially overlapping first and second switchable outcoupling areas are provided.

Figure 10:
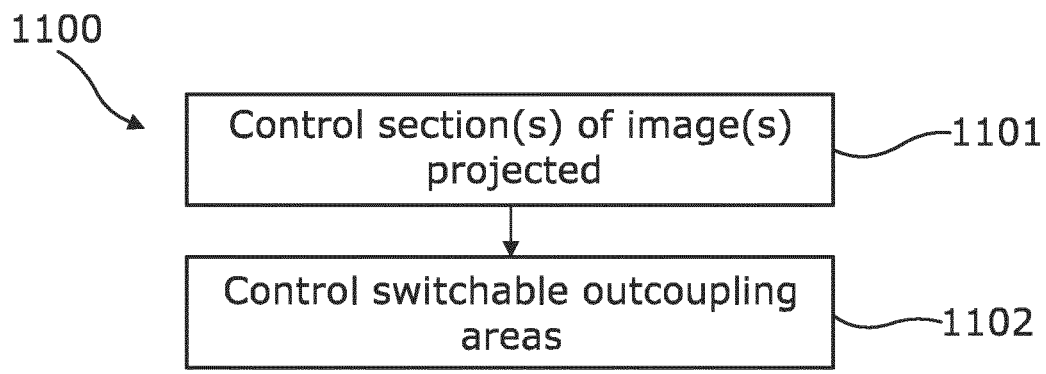
FIG. 10 shows another example of the subject matter described herein.

FIG. 10 schematically illustrates a flow chart of a method 1100 according to an example of the present disclosure that may be effected, for example, with an apparatus or system 20 as discussed above.

In block 1101, the projection of one or more sections of one or more images is controlled. Such sections of the image and the control of the projection of the same are discussed above not least with respect to FIGS. 3A-6D. Such control may comprise defining a plurality of sections of an input image and projecting individual sections, one at a time, to an IG of an EPE. Such control may be based in part on one or more of:
  information indicative of an overlap of the first and second OG's (e.g. indicative of a horizontal or vertical overlap of the OG's and amount thereof), and
  a field of view of a section of the input image.

In block 1102, the out-coupling state of switchable OG's is controlled. The control of the out-coupling states are discussed above not least with respect to FIGS. 3A-6D. Such control may comprise defining a plurality of sections of an OG and selectively controlling the out-coupling state of each section. Such control may be based in part on one or more of:

an angle in incidence of an input light beam of a section of the input image,
a field of view of a section of the input image,
synchronising the switching of OG sections with the projection of sections of the input image,
timing information associated with the projection of each section of the input image, and
information indicative of a position of a user's head and/or eyes.

The flowchart of FIG. 10 represents one possible scenario among others. In certain examples one or more blocks can be performed in a different order or overlapping in time, in series or in parallel. One or more blocks can be omitted or added or changed in some combination of ways.

Various, but not necessarily all, examples of the present disclosure can take the form of a method, an apparatus or a computer program. Accordingly, various, but not necessarily all, examples can be implemented in hardware, software or a combination of hardware and software. The blocks illustrated in FIG. 10 can represent actions in a method and/or sections of instructions/code in a computer program.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e. such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Figure 11:
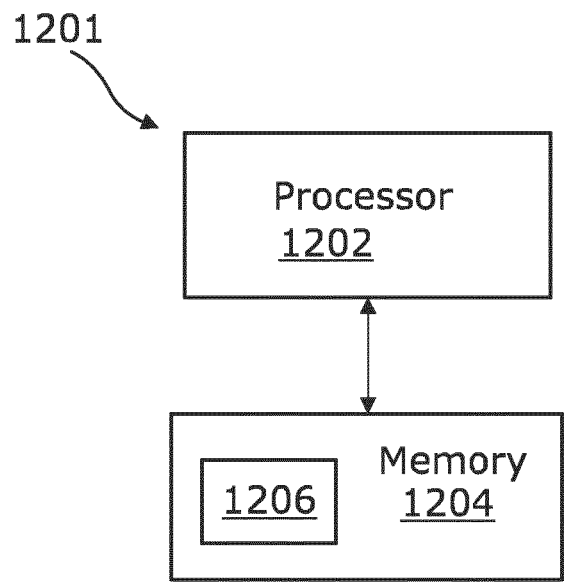
FIG. 11 shows another example of the subject matter described herein.

FIG. 11 schematically illustrates an example of a controller 1201 for controlling one or more functions of the above described apparatus and system, not least regarding the projection on sections of an input image and switching of the out-coupling states of the OG's.

Implementation of the controller 1201 can be as controller circuitry. Implementation of the controller 1201 can be in hardware alone (for example processing circuitry comprising one or more processors and memory circuitry comprising one or more memory elements), have certain aspects in software including firmware alone or can be a combination of hardware and software (including firmware).

The controller can be implemented using instructions that enable hardware functionality, for example, by using executable computer program instructions in a general-purpose or special-purpose processor that can be stored on a computer readable storage medium (disk, memory etc.) or carried by a signal carrier to be performed by such a processor.

In the illustrated example, the controller 1201 which is provided by a processor 1202 and memory 1204. Although a single processor and a single memory are illustrated in other implementations there can be multiple processors and/or there can be multiple memories some or all of which can be integrated/removable and/or can provide permanent/semi-permanent/dynamic/cached storage.

The memory 1204 stores a computer program 1206 comprising computer program instructions/code that control the operation of the apparatus/system when loaded into the processor 1202. The computer program instructions provide the logic and routines that enable the apparatus to perform the methods presently described.

The computer program instructions are configured to cause the apparatus at least to perform the method described, for example with respect to FIGS. 3A-6D.

The processor 1202 is configured to read from and write to the memory 1204.

The controller may be comprised in the above described apparatus 10, or system 20.

The apparatus 10 may therefore comprise:
at least one processor 1202; and
at least one memory 1204 including computer program instructions 1206
the at least one memory and the computer program instructions configured to, with the at least one processor, cause the apparatus at least to perform:
providing at least a first and a second light guiding means, wherein each light guiding means respectively comprises:
a plurality of diffractive means configured to: in-couple one or more input beams of light into the light guiding means, expand the one or more input beams of light, and out-couple the one or more expanded beams of light from the light guiding means to provide one or more expanded output light beams;
wherein the out-coupling diffractive means comprises a plurality of sections thereof that are independently switchable between a first out-coupling state and a second out-coupling state, wherein a section of the out-coupling diffractive means in the first out-coupling state permits the out-coupling of the one or more expanded beams of light therefrom, and wherein a section of the out-coupling diffractive means in the second out-coupling state precludes the out-coupling of the one or more expanded beams of light therefrom;
at least partially overlapping the out-coupling diffractive means of one light guiding means with the out-coupling diffractive means of the other light guiding means.

In some examples, there is provided computer program instructions which, when executed by a computer, cause the computer to control the out-coupling states of the plurality of independently switchable sections of the first and second out-coupling diffractive means of the apparatus of any previous claim.

Figure 12:
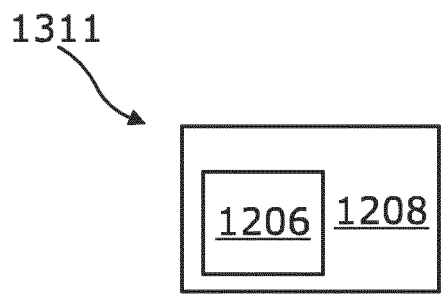
FIG. 12 shows another example of the subject matter described herein.

FIG. 12 illustrates a delivery mechanism 1311 for the computer program 1206. The delivery mechanism 1311 can be, for example, a non-transitory computer-readable storage medium 1208, a computer program product, a memory device, a record medium such as a compact disc read-only memory, or digital versatile disc, or an article of manufacture that tangibly embodies the computer program 1206. The delivery mechanism can be a signal configured to reliably transfer the computer program.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

In some examples, the apparatus can be and/or considered to be at least a part of any suitable display or system. For example, the apparatus can be a part of a Head-up Display (HUD), virtual reality (VR) system, such as VR glasses, augmented reality (AR) system, such as AR glasses, AR/VR system, such as AR/VR glasses, helmets with AR and/or VR and so on.

In one example, the apparatus is embodied on a hand held portable electronic device, such as a mobile telephone, wearable computing device or personal digital assistant, that can additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

The apparatus or system can, for example, be a client device, a mobile cellular telephone, a wireless communications device, a hand-portable electronic device etc. The apparatus can be embodied by a computing device, not least such as those mentioned above. However, in some examples, the apparatus can be embodied as a chip, chip set or module, i.e. for use in any of the foregoing. The apparatus can be a part of HUD, it can also be a part of a ground vehicle, for example a car, motorcycle, bicycle, tractor, train, harvester and so on, an aerial vehicle, for example a helicopter, drone, airship, aeroplane and so on, a water vehicle, for example a boat, ship, hovercraft, ferry, submarine and so on, a space vehicle, for example space shuttle, space capsule and so on, and/or an autonomous vehicle, and/or a semi-autonomous vehicle, and/or an automotive vehicle and so on.

The apparatus can be provided in a module. As used here 'module' refers to a unit or apparatus that excludes certain parts/components that would be added by an end manufacturer or a user.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The description of a function should additionally be considered to also disclose any means suitable for performing that function. Where a structural feature has been described, it can be replaced by means for performing one or more of the functions of the structural feature whether that function or those functions are explicitly or implicitly described.

It will be understood that each block and combinations of blocks, can be implemented by various means, such as hardware, firmware, and/or software including one or more computer program instructions. For example, one or more of the procedures described above can be embodied by computer program instructions. In this regard, the computer program instructions which embody the procedures described above can be stored by a memory storage device and performed by a processor.

As will be appreciated, any such computer program instructions can be loaded onto a computer or other programmable apparatus (i.e., hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Although specific terms are employed herein, they are used in a generic and descriptive sense only and not for purposes of limitation.

Features described in the preceding description can be used in combinations other than the combinations explicitly described.

Although functions have been described with reference to certain features, those functions can be performable by other features whether described or not.

Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims. For example, whilst examples have been described comprising two projectors, one projector (with a sufficiently fast response time and refresh rate, along with appropriate light guiding means) could be used to provide both the first and second sections of the first and second input images.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

As used herein, the term "determining" (and grammatical variants thereof) can include, not least: calculating, computing, processing, deriving, investigating, looking up (e.g., looking up in a table, a database or another data structure), ascertaining and the like.

Also, "determining" can include receiving (e.g., receiving information), accessing (e.g., accessing data in a memory), obtaining and the like. Also, "determining" can include resolving, selecting, choosing, establishing, and the like.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

We claim:

1. An apparatus, comprising:
at least a first light guide and a second light guide, wherein the light guides comprise:
a plurality of diffractive optical elements configured to: in-couple one or more input beams of light into the light guides, expand the one or more input beams of light, and out-couple the one or more expanded beams of light from the light guides to provide one or more expanded output light beams;
wherein the out-coupling diffractive optical elements comprise a plurality of sections thereof that are independently switchable between a first out-coupling state and a second out-coupling state based on respectively in-coupled one or more input beams, wherein a section of the out-coupling diffractive optical elements in the first out-coupling state permits the out-coupling of the one or more expanded beams of light therefrom, and wherein a section of the out-coupling diffractive optical elements in the second out-coupling state precludes the out-coupling of the one or more expanded beams of light therefrom;
wherein the apparatus is configured such that the out-coupling diffractive optical element of one light guide at least partially overlaps the out-coupling diffractive optical element of the other light guide.

2. The apparatus as claimed in claim 1, wherein one or more sections of the out-coupling diffractive optical element of the first light guide are respectively aligned with one or more sections of the out-coupling diffractive optical element of the second light guide, and wherein the apparatus is configured to selectively control the out-coupling states of aligned one or more sections of the first and second out-coupling diffractive optical elements such that they are not simultaneously in the first state.

3. The apparatus as claimed in claim 1, wherein the first light guide is configured to provide one or more expanded output light beams to form a first exit pupil for viewing with a user's first eye, wherein the second light guide is configured to provide one or more expanded output light beams to form a second exit pupil for viewing with a user's second eye, and wherein the apparatus is configured such that the first and second exit pupils do not overlap.

4. The apparatus as claimed in claim 1, wherein the one or more input beams of light comprise a plurality of sequentially received light beams, and wherein the plurality of sequentially received light beams is a projection of a section of an image.

5. The apparatus as claimed in claim 1, wherein the light guides are configured to:
receive a set of one or more input beams of a set of image sections of an image, and
output a virtual image of the image for a user to view; and
wherein the apparatus is configured such that: the output virtual image from the first light guide and the output virtual image from the second light guide at least partly overlap in the user's field of view.

6. The apparatus as claimed in claim 1, wherein the first light guide and the second light guide are configured to receive a set of one or more projected input beams of a set of image sections of an image; and wherein the apparatus is configured to control a timing of a switching of the out-coupling states of the sections of the out-coupling diffractive optical elements based in part on a timing of a projection of the projected input beam of light of a section of an image.

7. The apparatus as claimed in claim 6, wherein the apparatus is configured to control the out-coupling states of at least one section of the out-coupling diffractive optical elements based in part on at least one selected from the group of:
which of a plurality of sequentially input light beams is being projected; and
which of a plurality of sections of the image is being projected.

8. The apparatus as claimed in claim 1, wherein the one or more input light beams are projected, from a projector of the one or more input light beams, at one or more angles; and wherein the apparatus is configured to control the out-coupling states of the sections of the out-coupling diffractive optical elements based in part on the one or more angles.

9. The apparatus as claimed in claim 1, wherein the apparatus is configured to control the out-coupling states of the sections of the out-coupling diffractive optical elements based in part on information indicative of a location of one or more of a user's eyes.

10. The apparatus as claimed in claim 1, wherein:
the one or more input beams for one of the light guides comprises a plurality of sequentially input light beams, wherein the input light beam is a projection of a section of a plurality of sections of a first image;
the one or more input beams for the other of the light guides comprises a plurality of sequentially input light beams, wherein the input light beams are projections of a section of a plurality of sections of a second image; and
wherein at least a portion of the first and second images form a stereoscopic image pair for stereoscopic viewing.

11. The apparatus as claimed in claim 1, further comprising:
one or more projection engines configured to generate the one or more input beams.

12. The apparatus as claimed in claim 11, wherein the one or more projection engines are configured to project one of a plurality of sections of an image during a time period; and wherein the out-coupling states of the sections of the out-coupling diffractive optical elements during the time period are controlled based in part on which section of the image is being projected during the time period.

13. An apparatus as claimed in claim 1, wherein the apparatus comprises one or more of a module, a device, a display, a stereoscopic display, an autostereoscopic display, a head-up display, a display unit of a vehicle, or a vehicle.

14. A method, comprising:
providing at least a first light guide and a second light guide, wherein the light guides comprise:
a plurality of diffractive optical elements configured to:
in-couple one or more input beams of light into the light guides, expand the one or more input beams of light, and out-couple the one or more expanded beams of light from the light guides to provide one or more expanded output light beams;
wherein the out-coupling diffractive optical elements comprise a plurality of sections thereof that are independently switchable between a first out-coupling state and a second out-coupling state based on respectively in-coupled one or more input beams, wherein a section of the out-coupling diffractive optical element in the first out-coupling state permits the out-coupling of the one or more expanded beams of light therefrom, and wherein a section of the out-coupling diffractive optical element in the second out-coupling state precludes the out-coupling of the one or more expanded beams of light therefrom;
at least partially overlapping the out-coupling diffractive optical element of one light guide with the out-coupling diffractive optical element of the other light guide.

15. A non-transitory program storage device readable with an apparatus, tangibly embodying a program of instructions executable with the apparatus to control the out-coupling states of the plurality of independently switchable sections of first and second out-coupling diffractive optical elements of the apparatus of claim 1.

* * * * *